(12) United States Patent
Manolakos et al.

(10) Patent No.: US 11,668,806 B2
(45) Date of Patent: Jun. 6, 2023

(54) STAGGERED CHANNEL STATE INFORMATION REFERENCE SIGNAL RESOURCE SETS FOR TRACKING USED FOR POSITIONING

(71) Applicant: QUALCOMM Incorporated, San Diego, CA (US)

(72) Inventors: Alexandros Manolakos, San Diego, CA (US); Sony Akkarakaran, Poway, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/680,201

(22) Filed: Nov. 11, 2019

(65) Prior Publication Data

US 2020/0150254 A1 May 14, 2020

(30) Foreign Application Priority Data

Nov. 12, 2018 (GR) .............................. 20180100516

(51) Int. Cl.
*H04L 5/00* (2006.01)
*G01S 11/02* (2010.01)
*H04W 64/00* (2009.01)
*H04W 4/029* (2018.01)
*G01S 11/10* (2006.01)
*G01S 11/06* (2006.01)
*G01S 11/04* (2006.01)

(52) U.S. Cl.
CPC ............. *G01S 11/026* (2013.01); *G01S 11/04* (2013.01); *G01S 11/06* (2013.01); *G01S 11/10* (2013.01); *H04L 5/0007* (2013.01); *H04L 5/0048* (2013.01); *H04W 4/029* (2018.02); *H04W 64/003* (2013.01)

(58) Field of Classification Search
CPC .......... G01S 1/20; G01S 11/026; G01S 11/04; G01S 11/06; G01S 11/10; G01S 5/0036; H04L 5/0007; H04L 5/0048; H04W 64/00; H04W 4/029; H04W 64/003
See application file for complete search history.

(56) References Cited

U.S. PATENT DOCUMENTS

2014/0036800 A1\* 2/2014 Frenne .................. H04L 5/0048
370/329
2016/0344524 A1\* 11/2016 Kim ...................... H04L 5/0048
(Continued)

OTHER PUBLICATIONS

International Search Report and Written Opinion—PCT/US2019/060901—ISA/EPO—dated Apr. 21, 2020.

*Primary Examiner* — Quoc Thai N Vu
(74) *Attorney, Agent, or Firm* — MG-IP Law, P.C.

(57) ABSTRACT

Disclosed are techniques for receiving reference radio frequency (RF) signals for positioning estimation. In an aspect, a user equipment (UE) receives, from a network node, multiple resource sets for tracking (TRSs). Each TRS comprises a plurality of reference signal resources. The multiple TRSs are signals from a same antenna port or are quasi-co-located signals. The UE processes the multiple TRSs to determine positioning-related quantity(ies). The UE can estimate its position based on the positioning-related quantity(ies) and/or send the positioning-related quantity(ies) to the network.

30 Claims, 13 Drawing Sheets

(56) References Cited

U.S. PATENT DOCUMENTS

| | | |
|---|---|---|
| 2017/0289831 A1 | 10/2017 | Park et al. |
| 2017/0374638 A1* | 12/2017 | Han .......................... G01S 5/10 |
| 2018/0007576 A1 | 1/2018 | Lee et al. |
| 2018/0011163 A1 | 1/2018 | Han et al. |
| 2018/0124787 A1* | 5/2018 | Wang ................ H04W 72/0453 |
| 2020/0059277 A1* | 2/2020 | Su ........................ H04B 7/0473 |
| 2022/0026517 A1* | 1/2022 | Hasegawa ............. G01S 13/762 |

* cited by examiner

STAGGERED CHANNEL STATE INFORMATION REFERENCE SIGNAL RESOURCE SETS FOR TRACKING USED FOR POSITIONING

CROSS-REFERENCE TO RELATED APPLICATION

The present application for patent claims priority under 35 U.S.C. § 119 to Greek Patent Application No. 20180100516, entitled "STAGGERED CHANNEL STATE INFORMATION REFERENCE SIGNAL RESOURCE SETS FOR TRACKING USED FOR POSITIONING," filed Nov. 12, 2018, assigned to the assignee hereof, and expressly incorporated herein by reference in its entirety.

TECHNICAL FIELD

Various aspects described herein generally relate to wireless communication systems, and more particularly, to staggered channel state information reference signal (CSI-RS) resource sets used for positioning, e.g., in fifth generation (5G) new radio (NR) release 16 (REL-16).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To support position estimations in terrestrial wireless networks, a mobile device can be configured to measure and report the observed time difference of arrival (OTDOA) or reference signal timing difference (RSTD) between reference signals (RSs) received from two or more network nodes (e.g., different base stations or different transmission points (e.g., antennas, antenna ports) belonging to the same base station).

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a user equipment (UE) is disclosed. The method comprises receiving, from a network node, first and second tracking resource sets. The method also comprises processing the first and second tracking resource sets to determine one or more positioning related quantities. The method further comprises estimating a position of the UE based on the one or more positioning related quantities and/or reporting the one or more positioning related quantities to a network entity. The first tracking resource set comprises of a first plurality of reference signal resources, and the second tracking resource set comprises a second plurality of reference signal resources. The first and second pluralities of reference signal resources are mapped in the frequency domain into subcarriers which are staggered in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

An exemplary user equipment (UE) is disclosed. The UE comprises a transceiver, a memory, and a processor. The transceiver, the memory, and the processor are configured to receive, from a network node, first and second tracking resource sets. The transceiver, the memory, and the processor are also configured to process the first and second tracking resource sets to determine one or more positioning related quantities. The transceiver, the memory, and the processor are further configured to estimating a position of the UE based on the one or more positioning related quantities and/or report the one or more positioning related quantities to a network entity. The first tracking resource set comprises of a first plurality of reference signal resources, and the second tracking resource set comprises a second plurality of reference signal resources. The first and second pluralities of reference signal resources are mapped in the frequency domain into subcarriers which are staggered in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

Another exemplary user equipment (UE) is disclosed. The UE comprises means for receiving, from a network node, first and second tracking resource sets. The UE also comprises means for processing the first and second tracking resource sets to determine one or more positioning related quantities. The UE further comprises means for comprises estimating a position of the UE based on the one or more positioning related quantities and/or comprises means for reporting the one or more positioning related quantities to a network entity. The first tracking resource set comprises of a first plurality of reference signal resources, and the second tracking resource set comprises a second plurality of reference signal resources. The first and second pluralities of reference signal resources are mapped in the frequency domain into subcarriers which are staggered in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

An exemplary non-transitory computer-readable medium storing computer-executable instructions for a user equipment (UE) is disclosed. The computer-executable instructions comprise one or more instructions causing the UE to receive, from a network node, first and second tracking resource sets. The computer-executable instructions also comprise one or more instructions causing the UE to process the first and second tracking resource sets to determine one or more positioning related quantities. The computer-executable instructions further comprise one or more instructions causing the UE to estimate a position of the UE based on the one or more positioning related quantities and/or to report the one or more positioning related quantities to a network entity. The first tracking resource set comprises of a first plurality of reference signal resources, and the second tracking resource set comprises a second plurality of reference signal resources. The first and second pluralities of reference signal resources are mapped in the frequency domain into subcarriers which are staggered in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

An exemplary method performed by a network node is disclosed. The method comprises transmitting, to a user equipment (UE), first and second tracking resource sets. The method also comprises receiving, from the UE, one or more positioning related quantities based on the first and second tracking resource sets. The method further comprises estimating a position of the UE based on the one or more positioning related quantities and/or forwarding the positioning related quantities to a location server. The first tracking resource set comprises of a first plurality of reference signal resources, and the second tracking resource set comprises a second plurality of reference signal resources. The first and second pluralities of reference signal resources are mapped in the frequency domain into subcarriers which are in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

An exemplary network node is disclosed. The network node comprises a transceiver, a memory, and a processor. The transceiver, the memory, and the processor are configured to transmit, to a user equipment (UE), first and second tracking resource sets. The transceiver, the memory, and the processor are also configured to receive, from the UE, one or more positioning related quantities based on the first and second tracking resource sets. The transceiver, the memory, and the processor are further configured to estimate a position of the UE based on the one or more positioning related quantities and/or forward the positioning related quantities to a location server. The first tracking resource set comprises of a first plurality of reference signal resources, and the second tracking resource set comprises a second plurality of reference signal resources. The first and second pluralities of reference signal resources are mapped in the frequency domain into subcarriers which are in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

Another exemplary network node is disclosed. The network node comprises means for transmitting, to a user equipment (UE), first and second tracking resource sets. The network node also comprises means for receiving, from the UE, one or more positioning related quantities based on the first and second tracking resource sets. The network node further comprises means for estimating a position of the UE based on the one or more positioning related quantities and/or means for forwarding the positioning related quantities to a location server. The first tracking resource set comprises of a first plurality of reference signal resources, and the second tracking resource set comprises a second plurality of reference signal resources. The first and second pluralities of reference signal resources are mapped in the frequency domain into subcarriers which are in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

An exemplary non-transitory computer-readable medium storing computer-executable instructions for a network node is disclosed. The computer-executable instructions comprise one or more instructions causing the network node to transmit, to a user equipment (UE), first and second tracking resource sets. The computer-executable instructions also comprise one or more instructions causing the network node to receive, from the UE, one or more positioning related quantities based on the first and second tracking resource sets. The computer-executable instructions further comprise one or more instructions causing the network node to estimate a position of the UE based on the one or more positioning related quantities and/or to forward the positioning related quantities to a location server. The first tracking resource set comprises of a first plurality of reference signal resources, and the second tracking resource set comprises a second plurality of reference signal resources. The first and second pluralities of reference signal resources are mapped in the frequency domain into subcarriers which are in a same bandwidth or resource blocks relative to each other. The plurality of reference signal resources of the first tracking resource set are transmitted from a same antenna port of the network node or are quasi-co-located (QCL'd) reference signals with the plurality of reference signal resource of the second tracking resource set.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
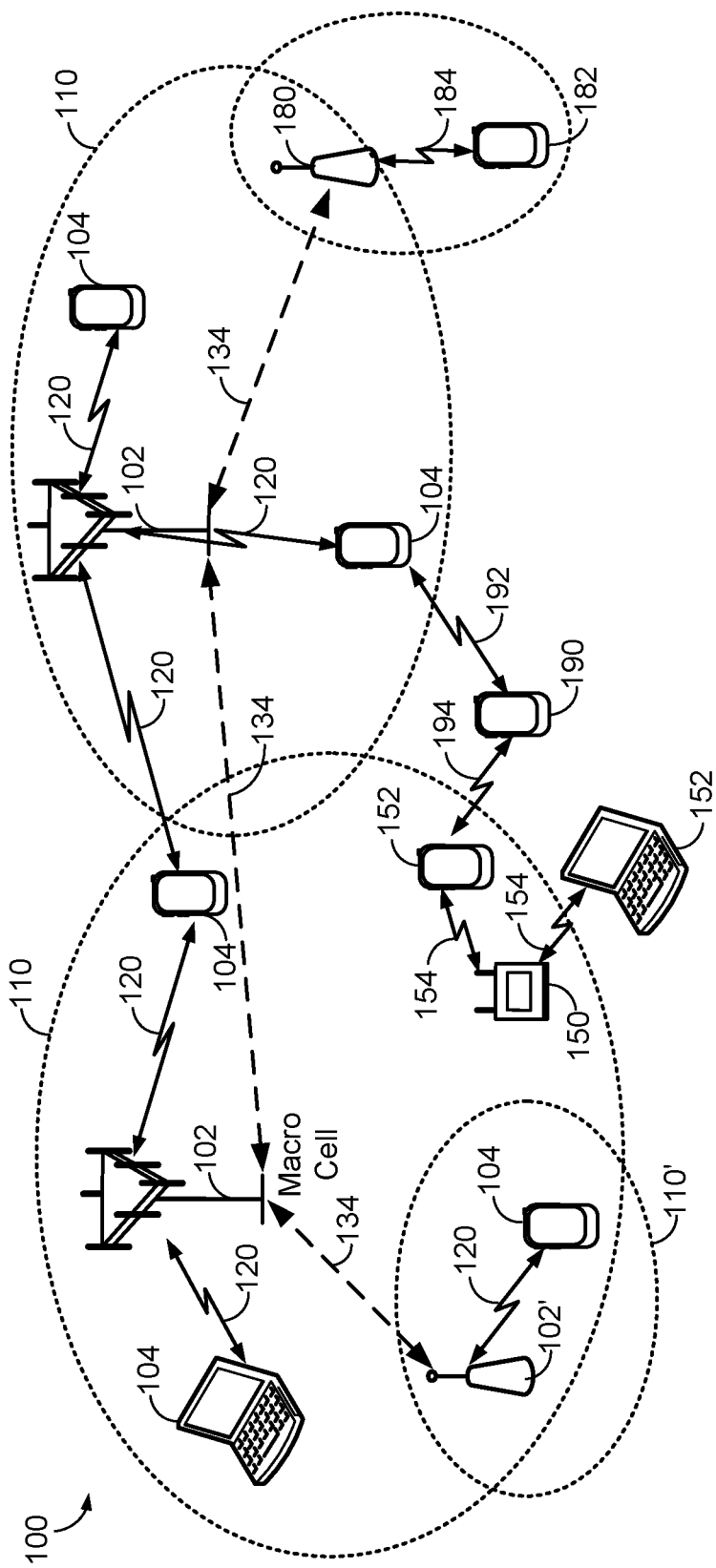
FIG. 1 illustrates an exemplary wireless communications system, according to various aspects.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Figure 2A:
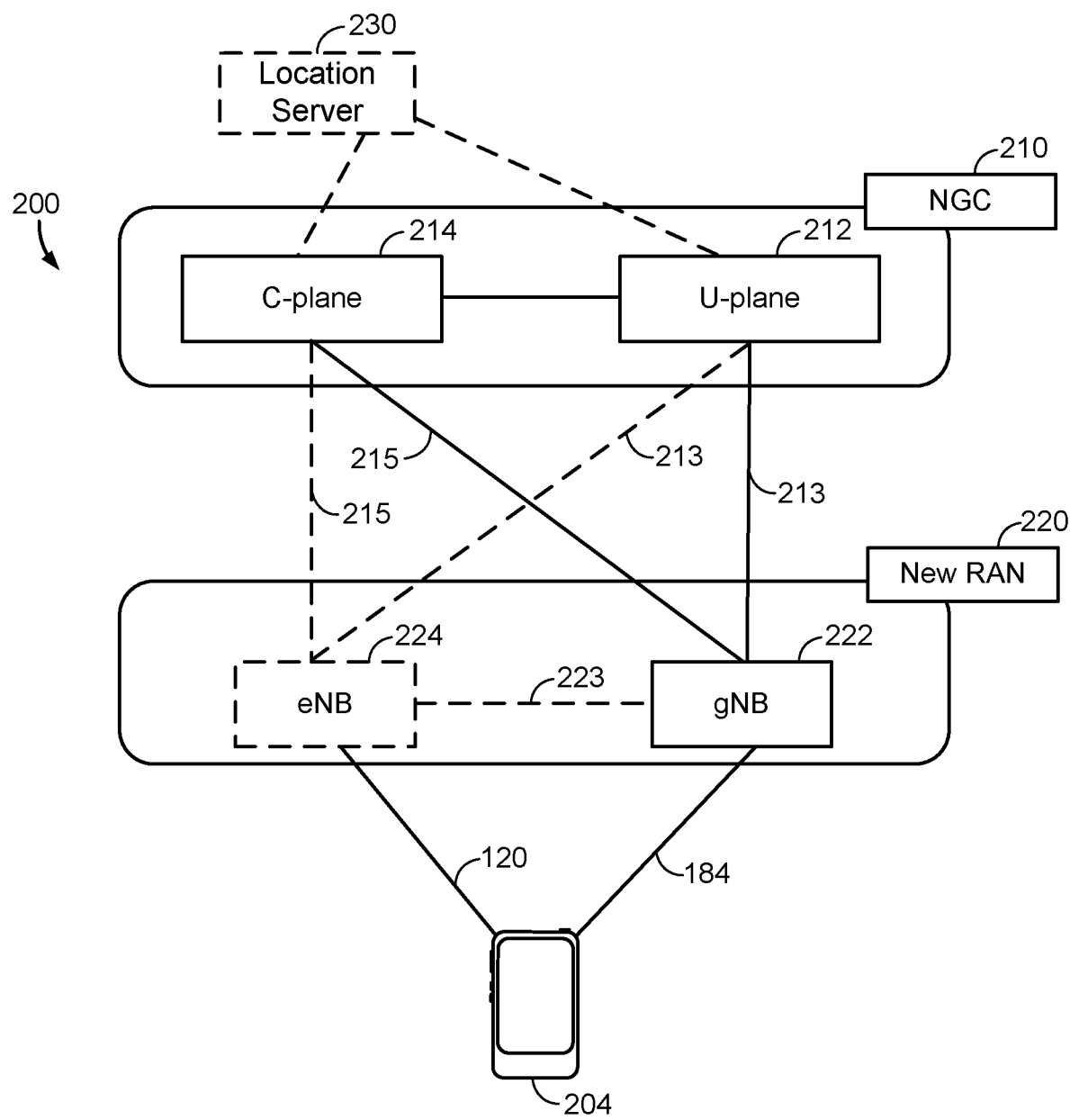
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
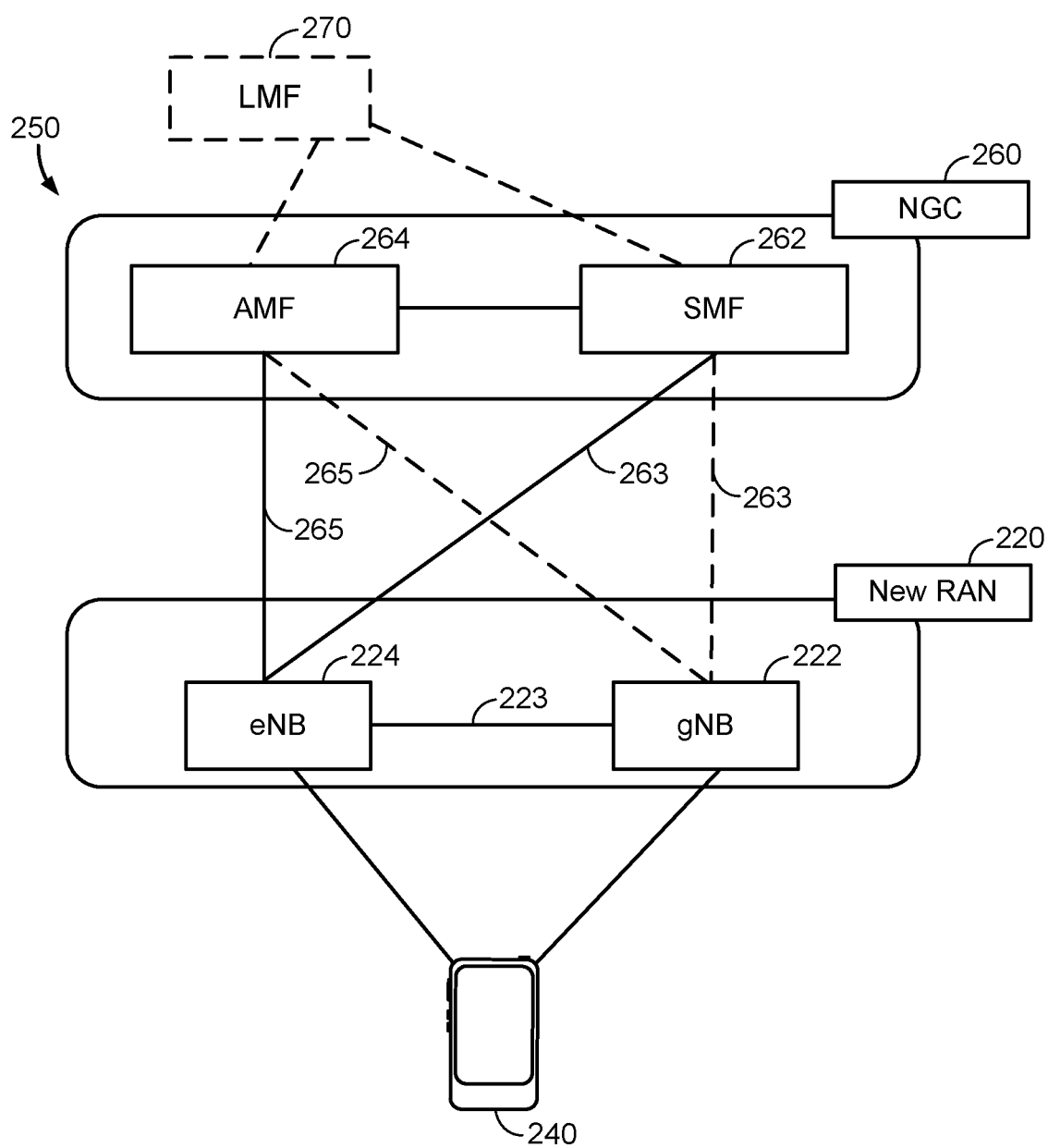

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 may connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
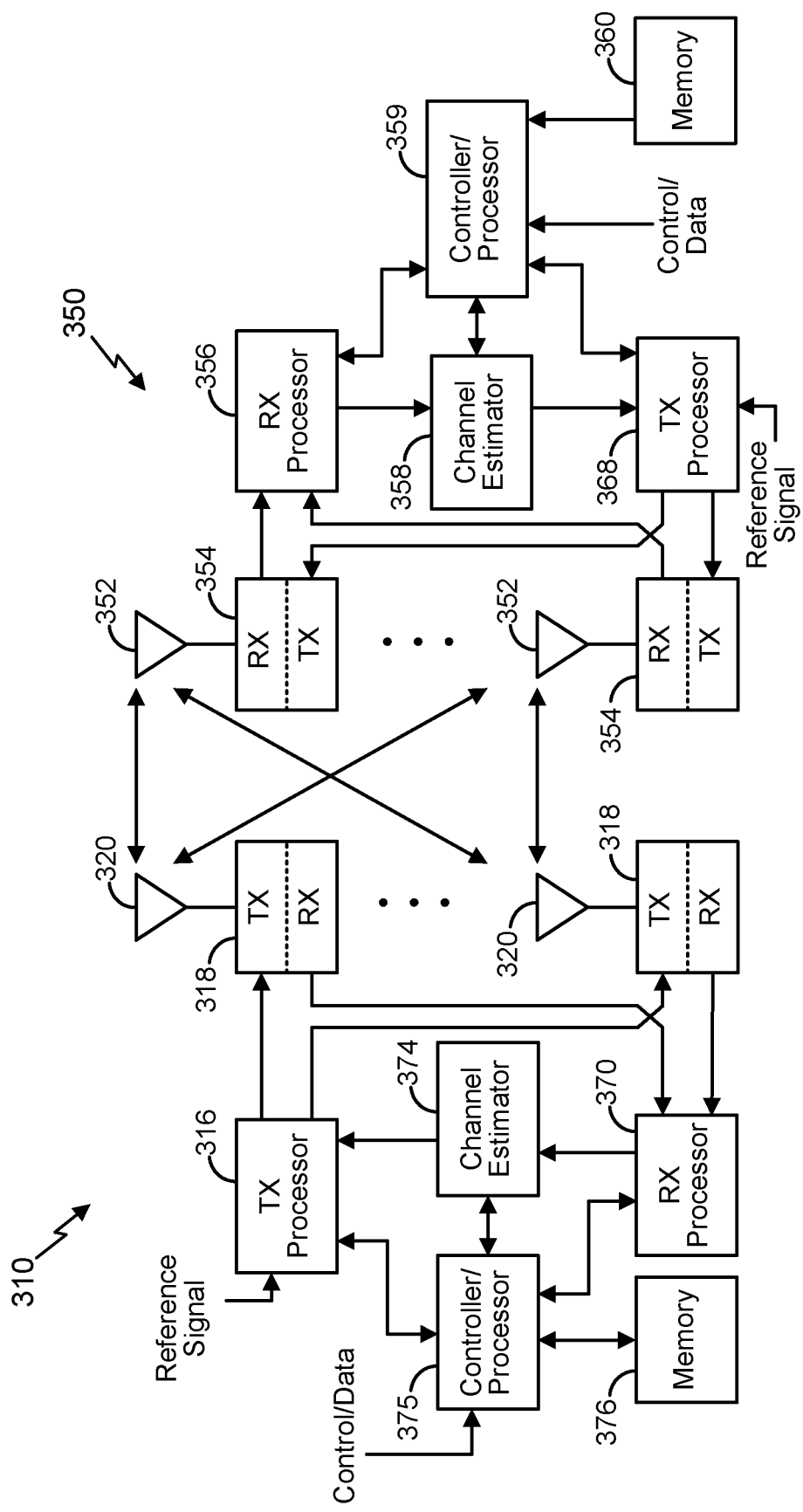
FIG. 3 illustrates an exemplary base station and an exemplary user equipment in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

In the UE 350, the transmitter 354TX and the receiver 354RX may together form a transceiver 354. In the base station 310, the transmitter 318TX and the receiver 318RX may together form a transceiver 318.

Figure 4:
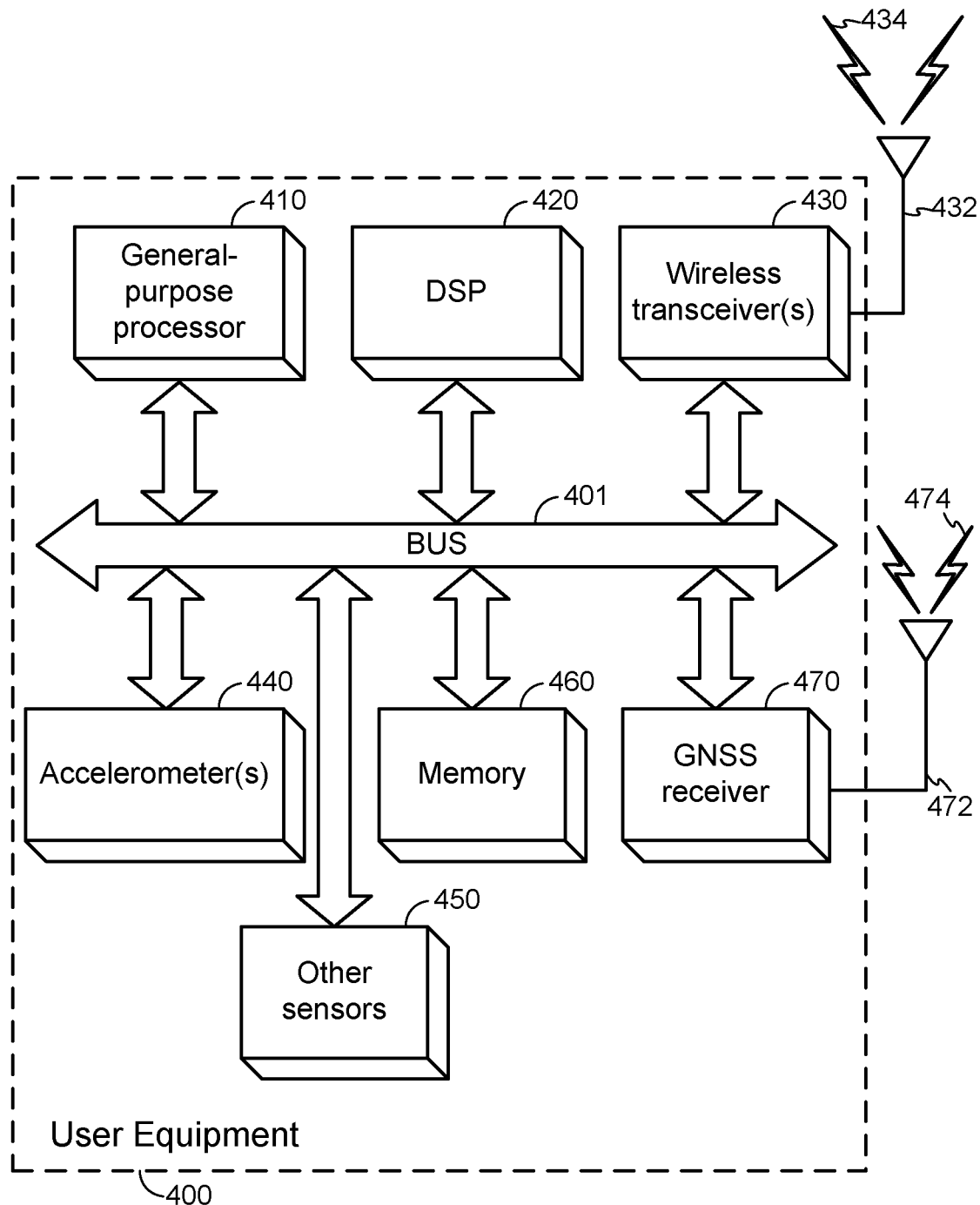
FIG. 4 illustrates exemplary features of a user equipment, according to various aspects.

FIG. 4 illustrates some exemplary features of a UE 400 according to various aspects of the disclosure. The UE 400 may comprise one or more processors 410 and one or more digital signal processors (DSPs) 420 configured to process data and to control overall operations of the UE 400. The UE 400 may also comprise one or more wireless transceivers 430 configured to transmit and receive wireless signals 434 via one or more antennas 432 (which may be internal and/or external) for communication with a network node (e.g., base station) of a network. The UE 400 may further comprise one or more memories 460 which may represent any storage medium (volatile and/or non-volatile—e.g., RAM, ROM, flash, etc.). The processor(s) 410, the DSP(s) 420, the transceiver(s) 430, and/or the memory(ies) 460 may be communicatively coupled to each other via a bus 401.

The UE 400 may additionally include one or more GNSS receivers 470 configured to receive satellite positioning signals 474 via one or more antennas 472 (also internal and/or external). The GNSS receiver(s) 470 may also be configured to determine the position of the UE 400 based on the received satellite positioning signals 474. The GNSS receiver(s) 470 may determine the position on its(their) own. Alternatively or in addition thereto, the GNSS receiver(s) 470 may cooperate with the processor(s) 410 and/or the DSP(s) 420 to determine the position of the UE 400. The UE 400 may yet additionally include sensors such as accelerometer(s) 440 and other sensor(s) 450 (e.g., channel estimator). The GNSS receiver(s) 470, the accelerometer(s) 440, and other sensor(s) 450 may also be communicatively coupled with the processor(s) 410, the DSP(s) 620, the transceiver(s) 430, and/or the memory(ies) 460 via the bus 401.

In an aspect, any of the processor(s) 410, the DSP(s) 620, the GNSS receiver(s) 470, the accelerometer(s), and/or other sensor(s) 450 may correspond to any one or more of the RX processor 356, the channel estimator 358, the TX processor 368, and/or the controller/processor 359 of the UE 350. The wireless transceiver(s) 430 and the antenna(s) 432 may correspond to the transceiver 354 and/or antenna 352 of the UE 350. The memory(ies) 460 may correspond to the memory 360 of the UE 350. Some or all elements of the UE 400 may take the form of one or more chipsets, ASICs, programmable logic devices (PDSs), field programmable gate arrays (FPGAs), and so on.

Figure 5:
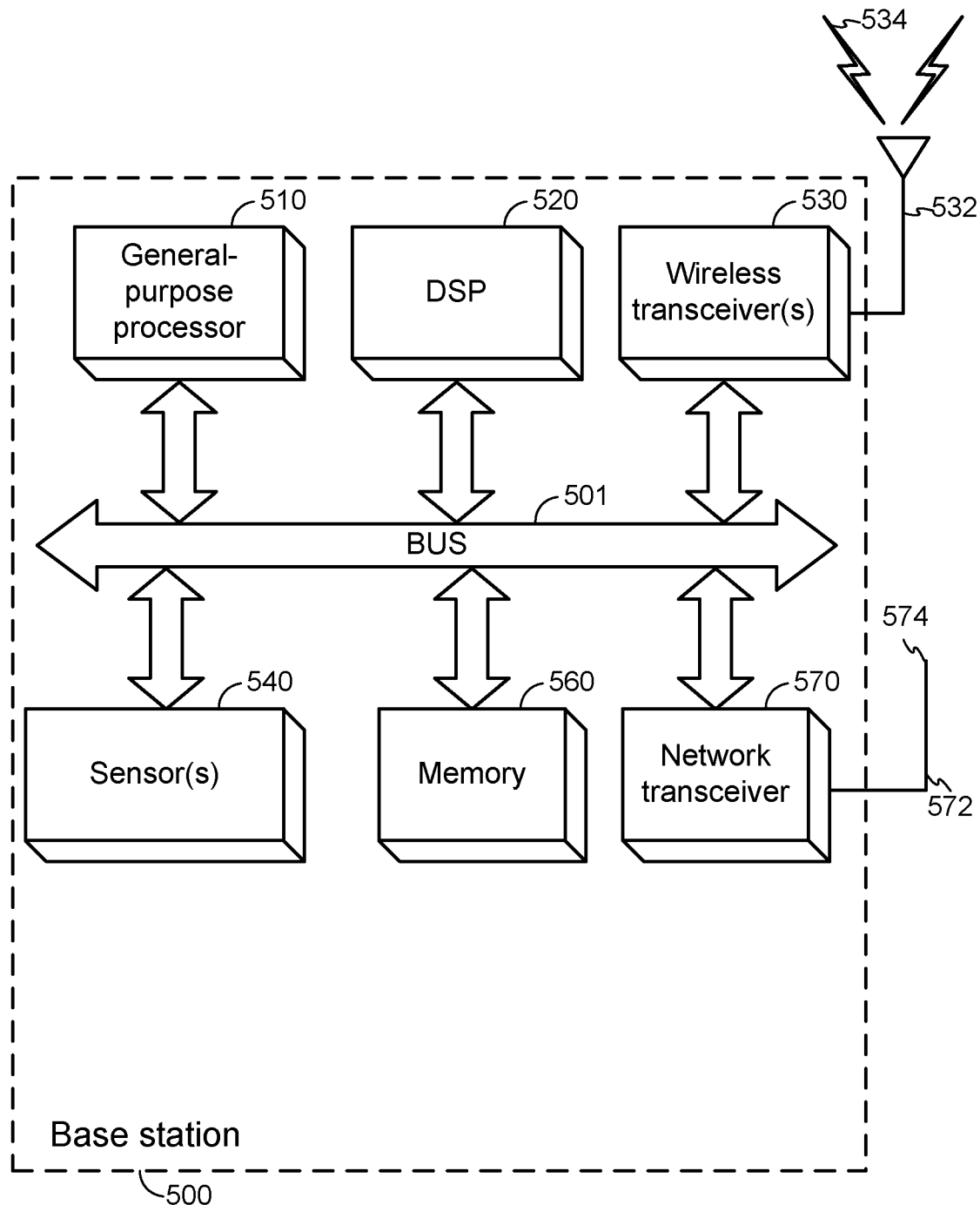
FIG. 5 illustrates exemplary features of a base station, according to various aspects.

FIG. 5 illustrates exemplary features of a base station, according to various aspects. The base station may be a eNB, a gNB, or the like. The base station 500 may comprise one or more processors 510 and one or more digital signal processors (DSPs) 520 configured to process data and to control overall operations of the base station 500. The base station 500 may also comprise one or more wireless transceivers 530 configured to transmit and receive wireless signals 534 via one or more antennas 532 (which may be internal and/or external) for communication with one or more UEs. The base station 500 may further comprise one or more memories 560 which may represent any storage medium (volatile and/or non-volatile—e.g., RAM, ROM, flash, etc.). The processor(s) 510, the DSP(s) 520, the transceiver(s) 530, and/or the memory(ies) 560 may be communicatively coupled to each other via a bus 501.

The base station 500 may additionally include one or more network transceivers 570 configured to receive and transmit communication signals 574 via a network interface 572 for communication with other base stations and/or with core network nodes (e.g., location server, LMF, AMF, etc.). The network transceiver 570 may be wired and/or wireless (e.g., communicate via microwave signals). The base station 500 may yet additionally include sensors 540 (e.g., channel estimator). The network transceiver 570 and/or the sensors 540 may also be communicatively coupled with the processor(s) 510, the DSP(s) 620, the transceiver(s) 530, and/or the memory(ies) 560 via the bus 501.

In an aspect, any of the processor(s) 510, the DSP(s) 620, and/or other sensor(s) 540 may correspond to any one or more of the TX processor 316, the channel estimator 374, the RX processor 370, and/or the controller/processor 375 of the base station 310. The wireless transceiver(s) 530, the antenna(s) 532, and/or the network transceiver(s) 570 may correspond to the transceiver 318 and/or antenna 320 of the base station 310. The memory(ies) 560 may correspond to the memory 376 of the base station 310. Some or all elements of the base station 500 may take the form of one or more chipsets, ASICs, programmable logic devices (PDSs), field programmable gate arrays (FPGAs), and so on.

Figure 6:
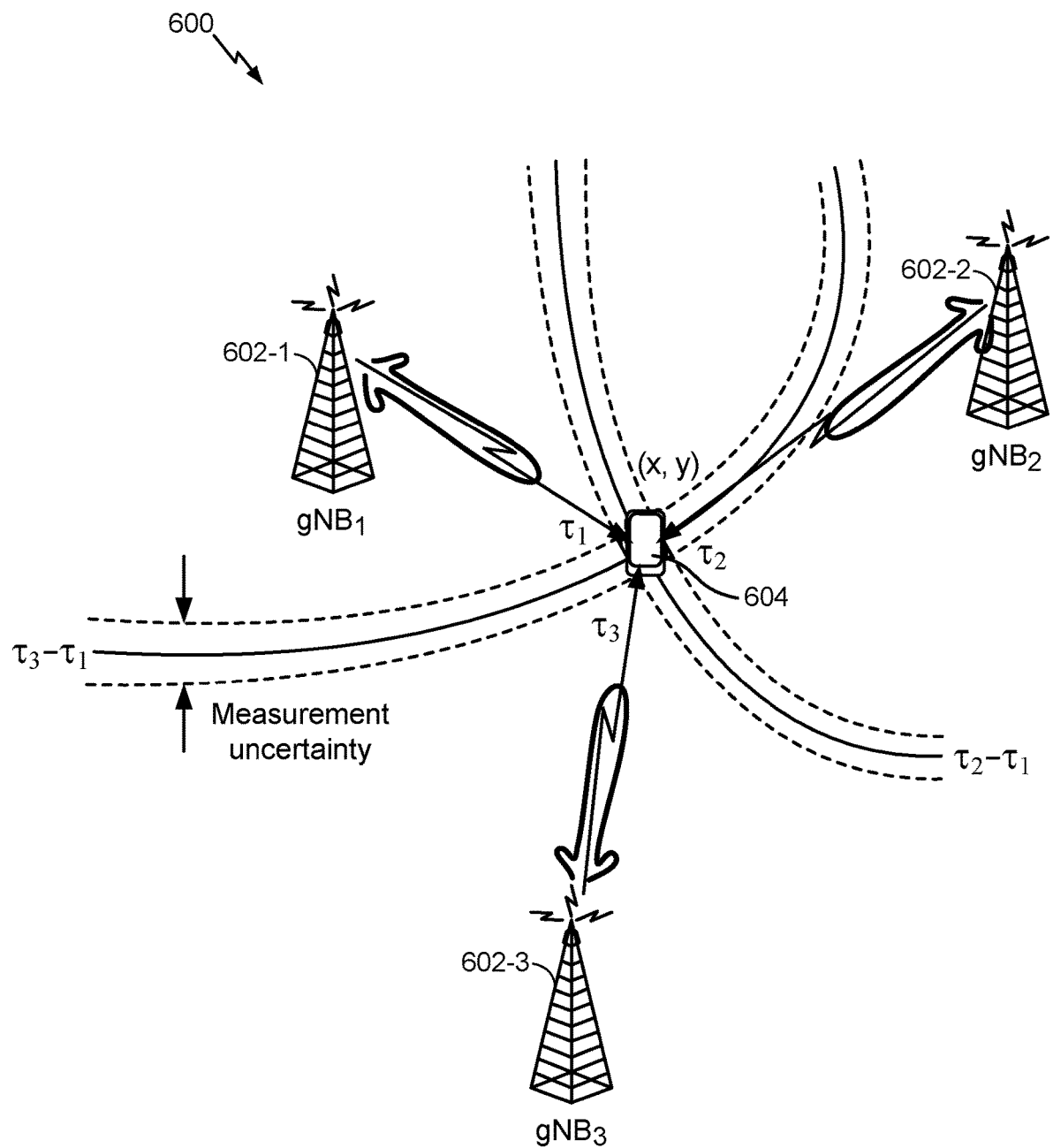
FIG. 6 illustrates a diagram illustrating an exemplary technique for determining a position of a mobile device using information obtained from a plurality of base stations.

FIG. 6 illustrates an exemplary wireless communications system 600 according to various aspects of the disclosure. In the example of FIG. 6, a UE 604, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate the estimate of its position. The UE 604 may communicate wirelessly with a plurality of base stations 602-1, 602-2, and 602-3 (collectively, base stations 602), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 600 (i.e., the base stations locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and four base stations 602, as will be appreciated, there may be more UEs 604 and more or fewer base stations 602.

To support position estimates, the base stations 602 may be configured to broadcast reference signals (RSs) (e.g., Positioning Reference Signals (PRS), Cell-specific Reference Signals (CRS), Channel State Information Reference Signals (CSI-RS), synchronization signals, etc.) to UEs 604 in their coverage area to enable a UE 604 to measure characteristics of such reference signals. For example, the Observed Time Difference of Arrival (OTDOA) positioning method, defined by the 3rd Generation Partnership Project (3GPP) (e.g., in 3GPP Technical Specification (TS) 36.355) for wireless networks that provide wireless access using 5G NR, is a multilateration method in which the UE 604 measures the time difference, known as a Reference Signal Time Difference (RSTD), between specific reference signals (e.g., PRS, CRS, CSI-RS, etc.) transmitted by different pairs of network nodes (e.g., base stations 602, antennas of base stations 602, etc.) and either reports these time differences to a location server, such as the location server 230 (also referred to location management function (LMF) in 5G NR), or computes a location estimate itself from these time differences.

Generally, RSTDs are measured between a reference network node (e.g., base station 602-1 in the example of FIG. 6) and one or more neighbor network nodes (e.g., base stations 602-2 and 602-3 in the example of FIG. 6). The reference network node remains the same for all RSTDs measured by the UE 604 for any single positioning use of OTDOA and would typically correspond to the serving cell for the UE 604 or another nearby cell with good signal strength at the UE 604. In an aspect, where a measured network node is a cell supported by a base station, the neighbor network nodes would normally be cells supported by base stations different from the base station for the reference cell and may have good or poor signal strength at the UE 604. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server, LFM, etc.) and/or serving base station (e.g., gNB) may provide OTDOA assistance data to the UE 604 for the reference network node (e.g., base station 602-1 in the example of FIG. 6) and the neighbor network nodes (e.g., base stations 602-2 and 602-3 in the example of FIG. 6) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal ID, reference signal bandwidth), a network node global ID, and/or other cell related parameters applicable to OTDOA. The OTDOA assistance data may indicate the serving cell for the UE 604 as the reference network node.

In some cases, OTDOA assistance data may also include "expected RSTD" parameters, which provide the UE 104 with information about the RSTD values the UE 604 is expected to measure at its current location between the reference network node and each neighbor network node, together with an uncertainty of the expected RSTD parameter. The expected RSTD, together with the associated uncertainty, may define a search window for the UE 604 within which the UE 604 is expected to measure the RSTD value. OTDOA assistance information may also include reference signal configuration information parameters, which allow a UE 604 to determine when a reference signal positioning occasion occurs on signals received from various neighbor network nodes relative to reference signal positioning occasions for the reference network node, and to determine the reference signal sequence transmitted from various network nodes in order to measure a signal Time of Arrival (ToA) or RSTD.

In an aspect, while the location server (e.g., location server 230, LMF, etc.) may send the assistance data to the UE 604, alternatively, the assistance data can originate directly from the network nodes (e.g., base stations 602) themselves (e.g., in periodically broadcasted overhead messages, etc.). Alternatively, the UE 604 can detect neighbor network nodes itself without the use of assistance data.

The UE 604 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the UE's 604 position may be calculated (e.g., by the UE 604 or by the location server 230). More particularly, the RSTD for a neighbor network node "k" relative to a reference network node "Ref" may be given as $(ToA_k - ToA_{Ref})$, where the ToA values may be measured modulo one subframe duration (1 ms) to remove the effects of measuring different subframes at different times. In the example of FIG. 6, the measured time differences between the reference cell of base station 602-1 and the neighboring cells of base stations 602-2 and 602-3 are represented as $\tau_2 - \tau_1$ and $\tau_3 - \tau_1$, where $\tau_1$, $\tau_2$, and $\tau_3$ represent the ToA of a reference signal from the transmitting antenna(s) of base station 602-1, 602-2, and 602-3, respectively. The UE 640 may then convert the ToA measurements for different network nodes to RSTD measurements (e.g., as defined in 3GPP TS 36.214 entitled "Physical layer; Measurements") and (optionally) send them to the location server 230. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 604 position may be determined (either by the UE 604, the location server 230, and/or the network node (e.g., serving gNB)).

When the UE 604 obtains a location estimate itself using OTDOA measured time differences, the necessary additional data (e.g., network nodes' locations and relative transmission timing) may be provided to the UE 604 by a location server (e.g., location server 230) and/or the serving gNB. In some implementations, a location estimate for the UE 604 may be obtained (e.g., by the UE 604 itself or by the location server 230) from OTDOA measured time differences and from other measurements made by the UE 604 (e.g., measurements of signal timing from GPS or other GNSS satellites). In these implementations, known as hybrid positioning, the OTDOA measurements may contribute towards obtaining the UE's 604 location estimate but may not wholly determine the location estimate.

Uplink Time Difference of Arrival (UTDOA) is a similar positioning method to OTDOA, but is based on uplink reference signals transmitted by the UE (e.g., UE 604). Further, transmission and/or reception beamforming at the network node and/or UE 604 can enable wideband bandwidth at the cell edge for increased precision. Beam refinements may also leverage channel reciprocity procedures in 5G NR.

As used herein, a "network node" may be a base station (e.g., a base station 602), a cell of a base station (e.g., a cell of a base station 602), a remote radio head, an antenna of a base station (e.g., an antenna of a base station 602, where the locations of the antennas of a base station are distinct from the location of the base station itself), an array of antennas of a base station (e.g., an array of antennas of a base station 602, where the locations of the antenna arrays are distinct from the location of the base station itself), or any other network entity capable of transmitting reference signals. Further, as used herein, a "network node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., a base station 602) corresponding to a cell of the base station. Where the term "base station" refers to multiple co-located physical transmission points, the physical transmission points may be an array of antennas (e.g., as in a Multiple Input-Multiple Output (MIMO) system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 604) and a neighbor base station whose reference signals the UE 604 is measuring.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

An "RF signal" comprises an electromagnetic wave that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The term "position estimate" is used herein to refer to an estimate of a position for a UE 604, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Referring back to FIG. 6, in order to identify the ToA of a reference signal transmitted by a given network node, the UE 604 first jointly processes all the resource elements (REs) on the channel on which that network node (e.g., base station 602) is transmitting the reference signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference signal. Generally, a UE will use a noise-related quality threshold to filter out spurious local peaks, thereby presumably correctly identifying significant peaks on the channel. For example, a UE may choose a ToA estimate that is the earliest local maximum of the CER that is at least X dB higher than the median of the CER and a maximum Y dB lower than the main peak on the channel. The UE determines the CER for each reference signal from each network node in order to determine the ToA of each reference signal from the different network nodes.

In 5G, tracking resource sets (TRS) can be used for positioning estimation. Each tracking resource set may comprise a plurality of reference signal (RS) resources. In an aspect, a tracking resource set enables time and frequency tracking capabilities, and may be configured as a channel state information reference signal (CSI-RS) resource set. The tracking resource set supports a single port. A UE can be configured with multiple tracking resource sets for multi-TRP/multi-panel transmission. A tracking resource set has equal resource element (RE) spacing in the frequency domain within a tracking resource set bandwidth. Further, tracking resource set can be UE-specifically managed. Table 1 below lists parameters, their definition, and values:

TABLE 1

| Parameter | Definition | Values to consider for further down-selection |
|---|---|---|
| X | Length of TRS burst in #slots | For sub-6: 2 slots; For above-6: 1 or 2 slots |
| Y | TRS burst periodicity in #slots | For sub-6 and above-6: 10, 20, 40, 80 ms |
| N | #OFDM symbols for TRS within a slot | For sub-6 and above-6: 2 symbols |
| B | TRS BW in #RBs | BWP*, ~50 RBs for periodicities of 20 ms and above, 50 RBs for 10 ms periodicity |
| Sf | TRS subcarrier spacing | 4 |
| St | TRS symbol spacing within slot | 4 |

Figure 7:
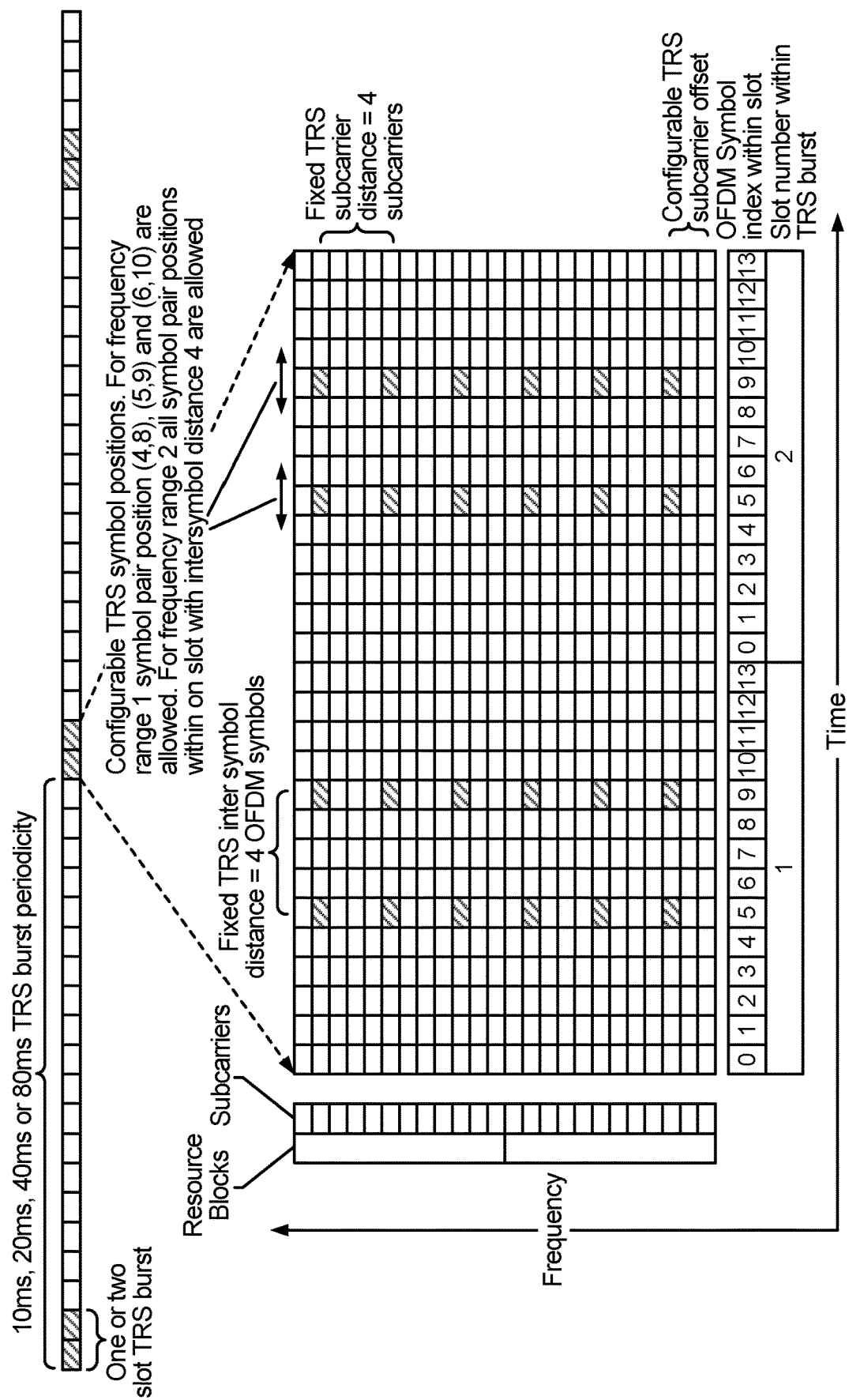
FIG. 7 illustrates a diagram illustrating an example resource structure for transmitting tracking reference signals.

It should be noted that UE is not expected to receive tracking reference signal outside of the bandwidth part (BWP). Also, the tracking reference signal resource block (RB) position is configured by gNodeB. FIG. 7 illustrates a diagram illustrating an example resource structure for transmitting tracking resource sets. The tracking resource set example in FIG. 7 has a burst length of 2 (X=2) and repeats every 20 slots (Y=20). Two RBs of the tracking reference signal are also illustrated in FIG. 7. Within each slot (12 subcarriers in the frequency domain, 14 symbols (or resources) in the time domain), two (N=2) resources 5 and 9 carry the tracking reference signal symbols.

Certain network nodes (whether a base station or UE), especially those capable of 5G NR communication, may use beamforming to send and receive information over a wireless channel. Transmit "beamforming" is a technique for focusing an RF signal in a specific direction. Traditionally, when a network node broadcasts an RF signal, it broadcasts the signal in all directions (omni-directionally). With transmit beamforming, the network node determines where a given target device (e.g., UE 104, 350, 400, 604) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), SINR, etc.) of the RF signals received from that direction.

Transmit beams may be quasi-co-located (QCL), meaning that they appear to the receiver as having the same parameters, regardless of whether or not the transmitting antennas themselves are physically co-located. In 5G NR, there are four types of QCL relations. Specifically, a QCL relation of a given type means that certain parameters about a second reference signal on a second beam can be derived from information about a source reference signal on a source beam. Thus, if the source reference signal is QCL Type A, the receiver can use the source reference signal to estimate the Doppler shift, Doppler spread, average delay, and delay spread of a second reference signal transmitted on the same channel. If the source reference signal is QCL Type B, the receiver can use the source reference signal to estimate the Doppler shift and Doppler spread of a second reference signal transmitted on the same channel. If the source reference signal is QCL Type C, the receiver can use the source reference signal to estimate the Doppler shift and average delay of a second reference signal transmitted on the same channel. If the source reference signal is QCL Type D, the receiver can use the source reference signal to estimate the spatial receive parameter of a second reference signal transmitted on the same channel.

Reference signals, such as PRS, may be transmitted on multiple frequency tones (also referred to as subcarriers or resource elements) of an Orthogonal Frequency-Division Multiplexing (OFDM) symbol of a slot (0.5 ms) of a subframe (1 ms) of a radio frame (10 ms). For example, if the reference signal is transmitted on each tone of an OFDM symbol, it is referred to as comb-1, and if it is transmitted on every fourth tone of an OFDM symbol, it is referred to as comb-4. There may be, for example, 12 tones, or subcarriers or resource elements, of an OFDM symbol.

Figure 8:
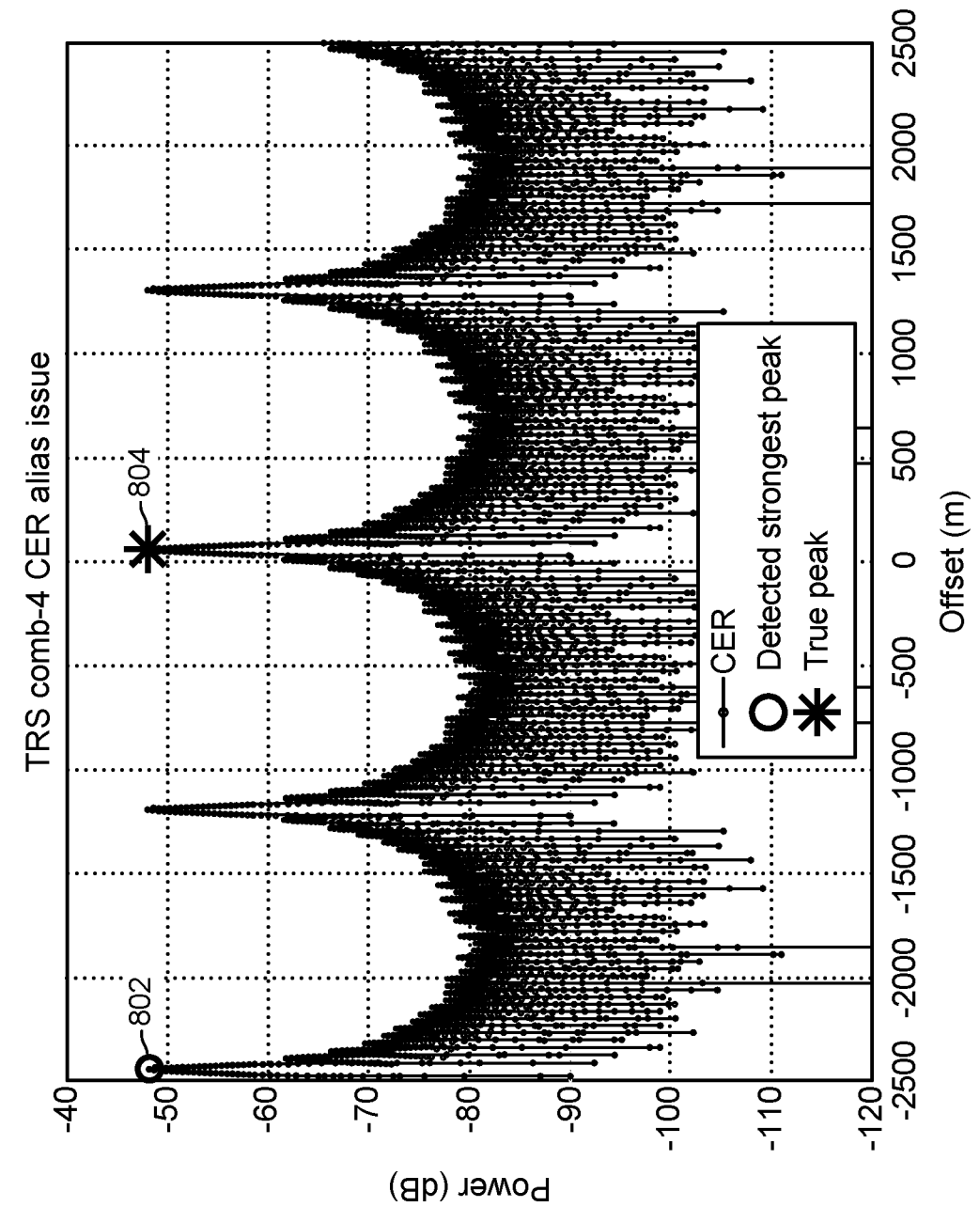
FIG. 8 shows a graph of a channel energy response (CER) estimate where the detected reference signal is transmitted using a comb-4 pattern.

If there are gaps in the frequency domain, such as with a comb-4 pattern, it can result in aliasing of the CER, especially where the measured network node is far away. This is a result of converting the frequency domain to the time domain when estimating the CER. FIG. 8 shows a graph 800 of a CER estimate where the detected reference signal is transmitted using a comb-4 pattern. As shown in FIG. 8, the CER has four significant peaks, due to the fact that the reference signal is being transmitted with a comb-4 pattern and the receiver is far away from the transmitter. However, the receiver (e.g., UE 604) may be unaware of this issue, and only one of these peaks is useful. Thus, in the example of FIG. 8, the receiver detects a significant peak at 802 and falsely identifies it as the strongest detected peak. In reality, the true peak is at 804. This is the issue with the frequency domain subsampling from using comb-4, especially where the receiver is far from the transmitter.

As such, it would be beneficial for a receiver to reduce the aliasing effects. Accordingly, the present disclosure proposes detect multiple reference signals, and combine the results to arrive at a true peak. Once the true peak is arrived at, the receiver will be able to determine a time-of-arrival (ToA) of signals from the transmitter to the receiver. From determining the ToAs from multiple transmitters, the receiver will also be able to determine other positioning related quantities such as time difference-of-arrival (TDoA), received signal time difference (RSTD), angle-of-arrival (AoA), reference signal received power (RSRP), and so on necessary to determine a position.

Note for each individual reference signal, aliasing still may result. However, by combining the individual detection results of multiple reference signals, the aliasing effects may be reduced or even removed completely. But in order to combine the detection results, the transmitted reference signals should be correlated to each other. Signals may be correlated if they are transmitted from a same antenna port. Signals may also be correlated if they are quasi-co-located (QCL'd) to each other. For example, and as indicated above, signals may be QCL'd with respect to a spatial transmit (Tx) filter and/or a spatial receive (Rx) filter. Also as indicated above, the signals may be QCL'd with respect to Doppler shift, Doppler spread, average delay, and/or delay spread. Note that the reference signals may be transmitted at different times. However, to maintain some satisfactory level of correlation, the reference signals should be received within some threshold duration of each other. This is true if the receiver is moving relative to the transmitter (e.g., UE is moving).

In the description below, it will be assumed that the network node (e.g., base station, eNB, eNodeB, gNB, gNodeB) is transmitting the reference signals and the UE is receiving the reference signals for estimating the UE position. However, it should be noted that the UE position can be estimated by switching the transmitter/receiver roles.

Broadly, a UE may be configured with a plurality of resource settings. Each resource settings may be associated with one of a plurality of transmission points of a network. Each transmission point may be distinct from all others of the plurality of transmission points. In this way, the signals transmitted a transmission point can have high correlation with each other and have low correlation with signals transmitted from other transmission points. Note that a transmission point need not be physically distinct from other transmission points, although that can be one of the distinguishing characteristics. There may be other distinguishing characteristics. For example, resources from a transmission point may have a distinct precode, scrambling id, and so on.

Each resource setting may include a plurality of tracking resource sets, and each tracking resource set may include a plurality of reference signal (RS) resources. Each RS resource may be mapped into one OFDM symbol. In an aspect, the resource settings may be implemented as CSI-RS resource configurations, and the tracking resource sets may be implemented as CSI-RS resource sets. Also, the plurality of RS resources of each tracking resource set may be implemented as a plurality of CSI-RS resources of each corresponding CSI-RS resource sets. The RS resources of the tracking resource sets may be CSI-RSs.

FIGS. 9A-9D illustrates a CSI-RS resource configuration (e.g., a resource setting) with four CSI-RS resource sets (e.g., tracking resource sets). Also each CSI-RS resource set includes four CSI-RS resources (e.g., plurality of RS resources of the tracking resource set). In an aspect, the four resource sets may be resources sets within same bandwidth and/or same resource blocks. Each CSI-RS resource set includes two slots (0,1), and a resource block (RB) in each slot. Each RB has 12 subcarriers (0-11) in the frequency domain and 14 symbols (0-13) in the time domain. FIGS. 9A-9D illustrate an example in which a number tracking resource sets for a resource setting is four. However, this can be any number smaller (e.g., two) or bigger.

Figure 9A:
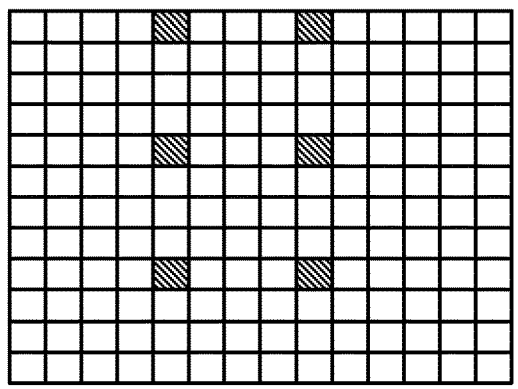
FIGS. 9A-9D illustrate examples of channel state information (CSI) resource sets.
Figure 9A:
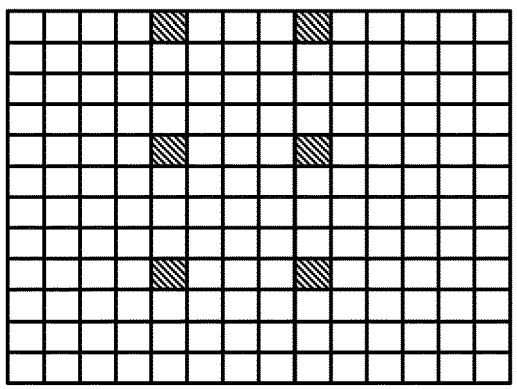

The first CSI-RS set (set 0) in FIG. 9A includes four reference signal resources (symbols 4 and 8 in both slots 0 and 1). The subcarrier offset is 0 meaning that the tracking resource set symbols are carried on subcarrier (or tone) 0 of each of the four resources. Also, the subcarrier spacing is four meaning that every fourth subcarrier (or tone) of each resource also carries the tracking resource set symbols. The second, third, and fourth CSI-RS sets (sets 1, 2, 3) are the same as the first CSI-RS set (set 0) except that the subcarrier offsets (tones) are different.

As mentioned, FIGS. 9A-9D are examples. The tracking resource sets for a given resource setting may include any number of RS resources, with any subcarrier offsets and spacings. But generally, the following may be said about the tracking resource sets. For each tracking resource set of each resource setting, the plurality of RS resources of that tracking resource set may be the same as the plurality of RS resources of other tracking resource sets of that resource setting. In other words, the tracking resource sets may belong on a same resource setting. In FIGS. 9A-9D, the resources 4, 8 of slot 0 and resources 4,8 of slot 1 are allocated. However, the subcarrier offset of the plurality of RS resources of each tracking resource set may be different from subcarrier offsets of the plurality of RS resources of all other tracking resource sets of that resource setting.

The UE may receive different tracking resource sets individually at different times (e.g., time division multiplexed (TDM'd)) and/or at different frequencies (frequency division multiplexed (FDM'd)). For example, assume that the UE individually receives from the network node the plurality of RS resources of the first, second, third, and fourth tracking resource sets of FIGS. 9A-9D. Due to the comb-4 pattern, the UE may detect aliasing in the CER for each tracking resource set.

Figure 10A:
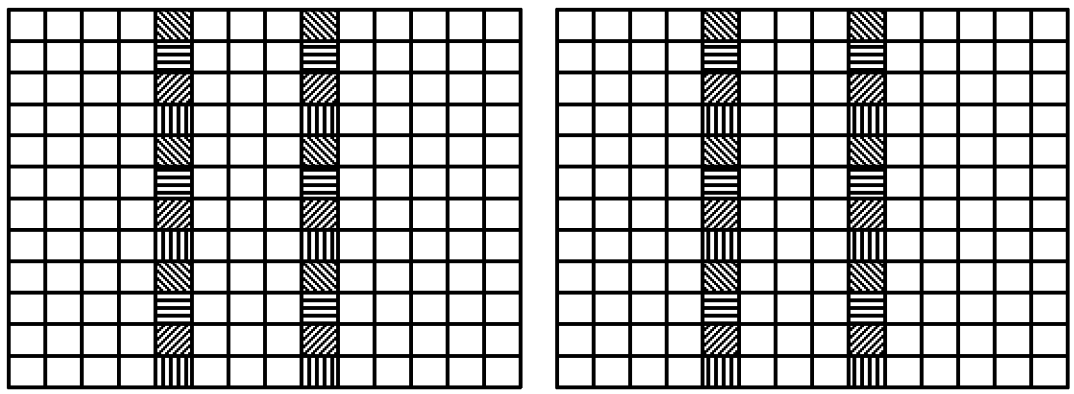
FIGS. 10A-10B illustrate examples of combining CSI resource sets.

However, recall that it is proposed to combine the individual detections. FIG. 10A illustrates an effective resource set by combining all of the individual tracking resource sets of a particular resource setting. As seen, by choosing the appropriate subcarrier offsets and subcarrier spacings of the tracking resource sets, when the detections results of the individual tracking resource sets are combined, effectively a comb-1 pattern results. In the best case, the aliasing can be removed entirely meaning that the true peak can be detected without much difficulty.

Figure 9B:
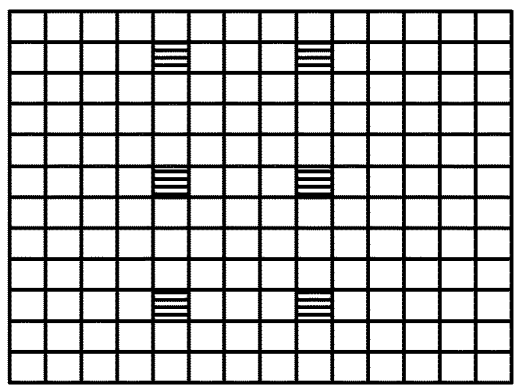
Figure 9B:
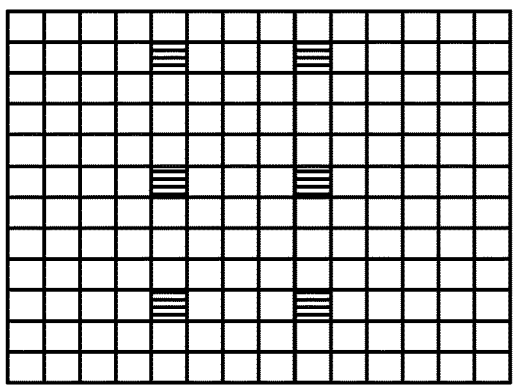
Figure 9C:
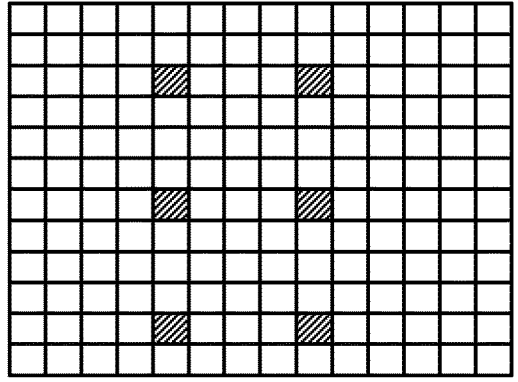
Figure 9C:
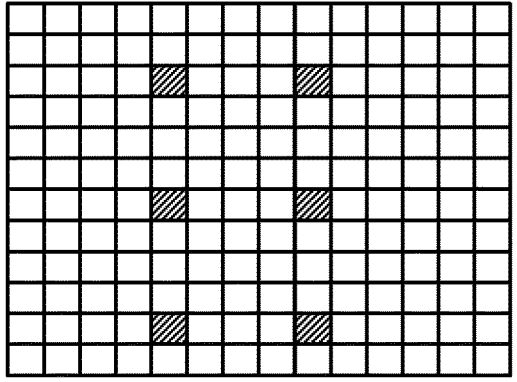
Figure 9D:
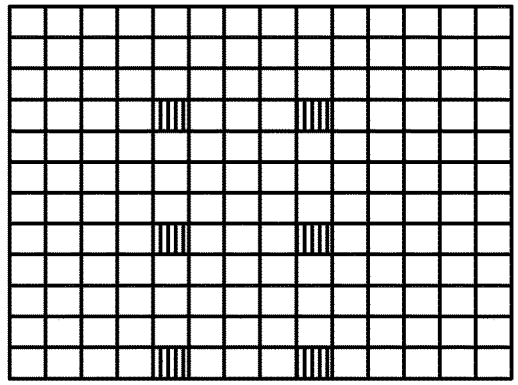
Figure 9D:
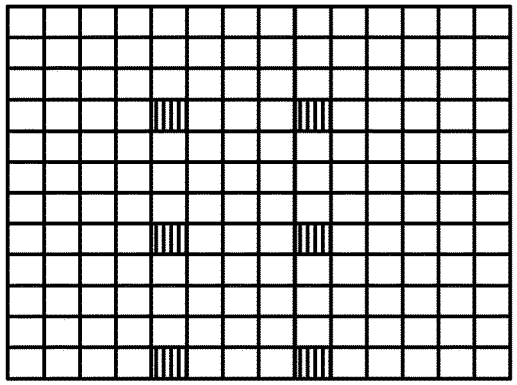
Figure 10B:
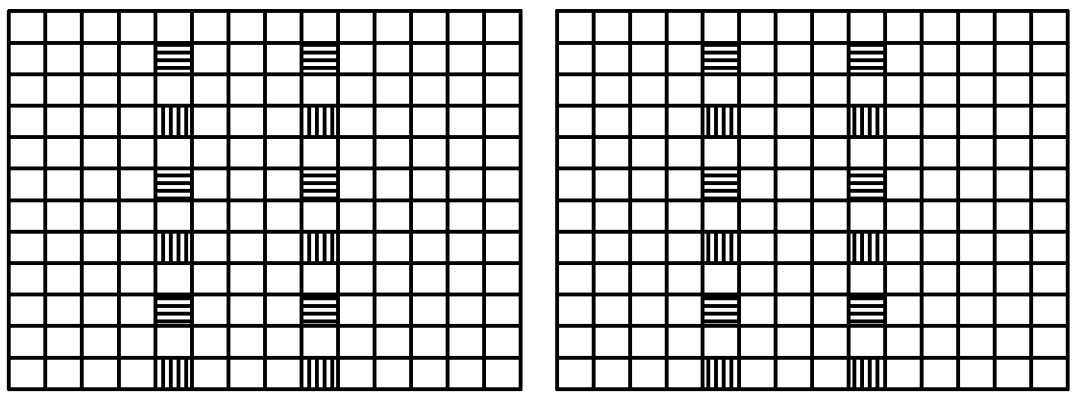

Note that it is possible that the number of tracking resource sets configured for a resource setting is not sufficient to result in an effective comb-1 pattern when combined. However, to reduce the aliasing effects as much as possible, it is desirable to have the pattern of resource be uniform in the frequency domain when combined. For example, assume that instead of four, only two tracking resource sets of FIGS. 9A-9D are configured. In this instance, FIG. 10B shows the combination of second and fourth tracking resource sets (FIGS. 9B, 9D).

This results in the staggered pattern of subcarriers, i.e., staggered pattern of RS resources in the frequency domain, in particular within the same bandwidth and/or within the same resource block. More importantly, the pattern is such that there is a uniform distribution of the RS resources in the frequency domain (every other tone starting from subcarrier 1), in particular within the same bandwidth and/or within the same resource block. Of course, first and third tracking resource sets (FIGS. 9A, 9C) may be an alternative. Less desirable (although doable) are first and second or combining third and fourth tracking resource sets.

This also indicates the following. Even when the number of tracking resource sets is sufficient for effective comb-1 pattern, the network node may transmit the tracking resource sets such that pattern of RS resources are uniform (to the extent possible). For example, if the network node transmits the first tracking resource set (associated FIG. 9A), then the next transmission may be the third tracking resource set (associated with FIG. 9C).

Figure 11:
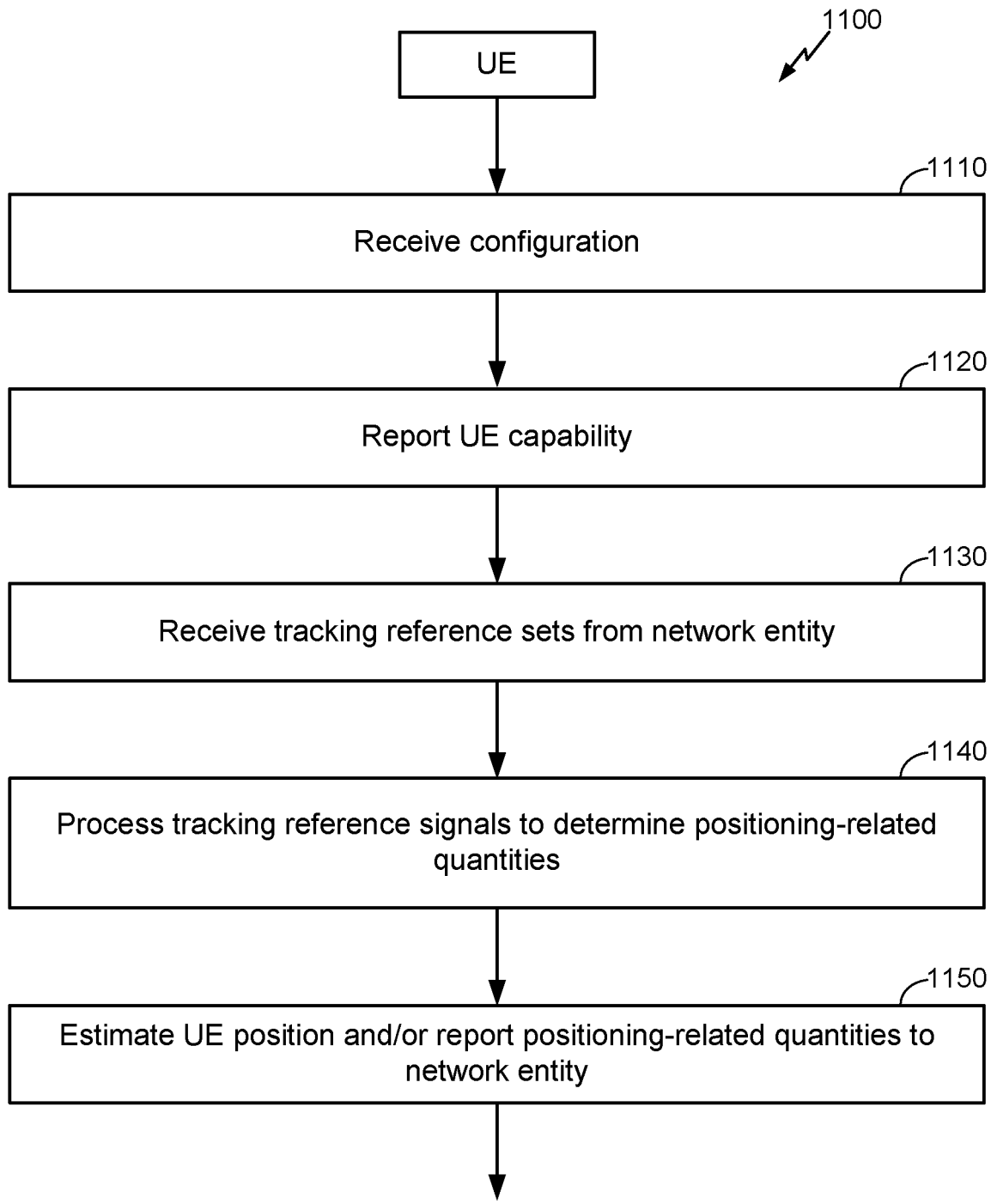
FIG. 11 illustrates an exemplary method performed by a user equipment (UE)

FIG. 11 illustrates an exemplary method 1100 performed by a UE for position estimation of the UE. In an aspect, the memory 360 of the UE 350 in FIG. 3 may be an example of a computer-readable medium that stores computer executable instructions for one or more of the TX processor 368, the controller/processor 359, the RX processor 356, and/or the channel estimator 358 of the UE 350 to perform the method 1100. In another aspect, the memory(ies) 460 of the UE 400 in FIG. 4 may be an example of a computer-readable medium that stores computer executable instructions for one or more of the processor(s) 410, the DSP(s) 420, the transceiver(s) 430, the accelerometer(s) 440, other sensor(s) 450, and/or the GNSS receiver(s) 470 of the UE 400 to perform the method 1100.

At 1110, the UE may receive, from a network entity (e.g., location server, LMF, serving base station, etc.), a configuration to configure the UE with the plurality of resource settings (e.g., CSI-RS resource configurations). Each resource setting may comprise a plurality of tracking resource sets with each tracking resource set comprising a plurality of RS resources. For each tracking resource set of each resource setting, the plurality of RS resources of that tracking resource set may be the same as the plurality of RS resources of other tracking resource sets of that resource setting. Also for each tracking resource set of each resource setting, a subcarrier offset of the plurality of RS resources of that tracking resource set may be different from subcarrier offsets of the plurality of RS resources of all other tracking resource sets of that resource setting. Each resource setting can be associated with one of a plurality of transmission points in which each transmission point can be distinct from all others of the plurality of transmission points.

In an aspect, means to perform block 1110 may include one or more of the controller/processor 359, the memory 360, the RX processor 356, the receiver 354RX, and/or the antenna 352 of the UE 350 illustrated in FIG. 3. In another aspect, means to perform block 1110 may include one or more of the processor(s) 410, the DSP(s) 420, the transceiver(s) 430, the antenna(s) 432 and/or the memory(ies) 460 of the UE 400 illustrated in FIG. 4.

At 1120, the UE may report the UE capability to the network node. For example, the UE may report the threshold duration. In an aspect, means to perform block 1120 may include one or more of the controller/processor 359, the memory 360, the TX processor 368, the transmitter 354TX, and/or the antenna 352 of the UE 350 illustrated in FIG. 3. In another aspect, means to perform block 1120 may include one or more of the processor(s) 410, the DSP(s) 420, the transceiver(s) 430, the antenna(s) 432, and/or the memory(ies) 460 of the UE 400 illustrated in FIG. 4.

At 1130, the UE may receive, from a network node (e.g., serving base station, neighboring base station, etc.), multiple correlated tracking resource sets such as first and second tracking resource sets. For example, the plurality of RS resources of the first tracking resource set may be transmitted from a same antenna port of the network node or may be QCL'd reference signals with the plurality of RS resources of the second tracking resource set. If they are QCL'd, the first and second tracking resource sets may be QCL'd to each other with respect to a spatial Tx filter, a spatial Rx filter, Doppler shift, Doppler spread, average delay, delay spread, and/or any combination thereof. The first and second tracking resource sets may be CSI-RSs.

The first tracking resource set may be associated with a first tracking resource set of a particular resource setting, and the second tracking resource set may be associated with a second tracking resource set of the same particular resource setting. The first and second tracking resource sets may respectively comprise first and second pluralities of RS resources. The first and second pluralities of RS resources may be same. However, the first and second pluralities of RS resources may be mapped in the frequency domain into subcarriers that are staggered relative to each other, i.e., they may be staggered in frequency (e.g., see FIG. 10B). The mapping may be such that the subcarriers are staggered in a same bandwidth and/or in a same resource block relative to each other.

In an aspect, means to perform block 1130 may include one or more of the controller/processor 359, the memory 360, the RX processor 356, the receiver 354RX, and/or the antenna 352 of the UE 350 illustrated in FIG. 3. In another aspect, means to perform block 1130 may include one or more of the processor(s) 410, the DSP(s) 420, the transceiver(s) 430, the antenna(s) 432 and/or the memory(ies) 460 of the UE 400 illustrated in FIG. 4.

At 1140, the UE may process the first and second tracking resource sets to determine one or more positioning related quantities (e.g., ToA, TDoA, RSTD, AoA, RSRP, etc.). For example, the UE may determine the channel energy response (CER) of the first tracking resource set, and the CER of the second tracking resource set. The UE then may determine the positioning-related quantity(ies) based on the first and second CERs. For example, as indicated above, the CERs of the first and second tracking resource sets may be combined reduce or even remove the aliasing effect so as to arrive at a true ToA. When ToAs between multiple network nodes and the UE are determined, then TDoAs and/or RSTDs and/or OTDOAs may be calculated.

As indicated, the resources of the tracking resource sets may be TDM'd or FDM'd. In an aspect, if the first and second tracking resource sets are TDM'd, then the UE may process the first and second tracking resource sets as if they are QCL'd reference signals with respect to a spatial receive (Rx) filter, a spatial transmit (Tx) filter, Doppler shift, Doppler spread, average delay, and/or delay spread. On the other hand, if they are FDM'd, then the UE may process the first and second tracking resource sets as if they are from a same antenna port of the network node.

In an aspect, the first and second tracking resource sets may be processed when they are received within the threshold duration of each other. One reason for the threshold duration is as follows. If the UE is moving and the first and second tracking resource sets are received far apart in time, then the correlation between the two signals may be significantly reduced. For example, there phases may be completely different. By enforcing the threshold duration, the correlation integrity between the first and second tracking resource sets may be maintained to some minimum satisfactory level. At 1120, the UE may report this as one of several capability parameters, or it may be statically defined.

In an aspect, means to perform block 1140 may include one or more of the controller/processor 359, the memory 360, the RX processor 356, the channel estimator 358, the receiver 354RX, and/or the antenna 352 of the UE 350 illustrated in FIG. 3. In another aspect, means to perform block 1140 may include one or more of the processor(s) 410, the DSP(s) 420, other sensor(s) 450, the memory(ies) 460 and/or the GNSS receiver(s) 470 of the UE 400 illustrated in FIG. 4.

At 1150, the UE (e.g., UE 350, specifically, RX processor 356 and/or channel estimator 358 and/or controller/processor 359) may estimate a position of the UE at least based on the positioning related quantities. Alternatively, or in addition thereto, the UE (e.g., UE 350, specifically, channel estimator 358 and/or controller/processor 359 and/or TX processor 368 and/or transceiver 354) may report the positioning related quantities to the network entity (e.g., location server, LMF, serving base station, etc.).

In an aspect, means to perform block 1150 may include one or more of the controller/processor 359, the memory 360, the TX processor 368, the transmitter 354TX, and/or the antenna 352 of the UE 350 illustrated in FIG. 3. In another aspect, means to perform block 1150 may include one or more of the processor(s) 410, the DSP(s) 420, the transceiver(s) 430, the antenna(s) 432, other sensor(s) 450, the memory(ies) 460 and/or the GNSS receiver(s) 470 of the UE 400 illustrated in FIG. 4.

In an aspect, the UE may be notified by the network entity that the first and second tracking resource sets of the same resource setting are for positioning purposes. The network entity may notify the UE through higher layer protocol signaling (e.g., higher than physical layer signaling). For example, when the network entity is a core network component (e.g., location server, LMF, etc.), the UE may be notified through LTE positioning protocol (LPP). When the network entity is the base station (e.g., serving base station, then the UE may be notified through radio resource control (RRC) signaling. Alternatively or in addition thereto, the UE may determine that the first and second tracking resource sets of the same resource setting are for positioning purposes when there is one CSI report configuration associated with the resource setting which indicates that the one or more positioning related quantities are fed back to the network node.

Recall from above that each resource setting may be associated with a transmission point. In an aspect, each resource setting may be identified with an RRC configured value that is related to the transmission point associated with that resource setting. Also, all resources of the plurality of tracking resource sets of each resource setting can be scrambled based on the RRC configured value.

While the method 1100 has been described with respect to receiving and processing first and second tracking resource sets, it is noted that the method can be generalized to receiving and processing any number of correlated tracking resource sets. For example, at 1130, the UE may receive a plurality of correlated tracking resource sets (e.g., four). In other words, the plurality of reference signals (e.g., plurality of CSI-RSs) may be from a same antenna port or may be QCL'd. The plurality of tracking resource sets may be in a same bandwidth or same resource blocks. At 1140, the plurality of tracking resource sets may be processed (e.g., multiple CERs may be determined) and the positioning related quantities may be determined therefrom. When the tracking resource sets are combined, the pattern of resources may be uniform in the frequency domain (uniform subcarriers). The UE may process the plurality of tracking resource sets if they are received within the threshold duration.

Note that to estimate the position of the UE, ToA's between the UE and multiple network nodes should be determined. Referring back to FIG. 6, the ToAs between the UE and each of the network nodes (e.g., base stations 602-1, 602-2, 602-3) may be determined to arrive at RSTDs. The position of the UE may be estimated from the RSTDs. This means that the UE may receive multiple tracking resource sets from the base station 602-1, multiple tracking resource sets from the base station 602-2, and multiple tracking resource sets from the base station 602-3. If each base station 602 is viewed as a transmission point, then the tracking resource sets from each base station 602 may be associated with different resource setting.

In an aspect, each resource setting can have its own time behavior. For example, the transmission timings of the tracking resource sets associated with one resource setting can be independent of transmission timings of other resource settings. For example, one network node may transmit periodic resource configurations, another may transmit aperiodic resource configurations, and yet another may transmit semi-persistent resource configurations. Then between any two resource settings, they may be different when the transmission timing of one is one of three timing types (periodic, semi-persistent, and aperiodic) and the other is one of the remaining two timing types.

Figure 12:
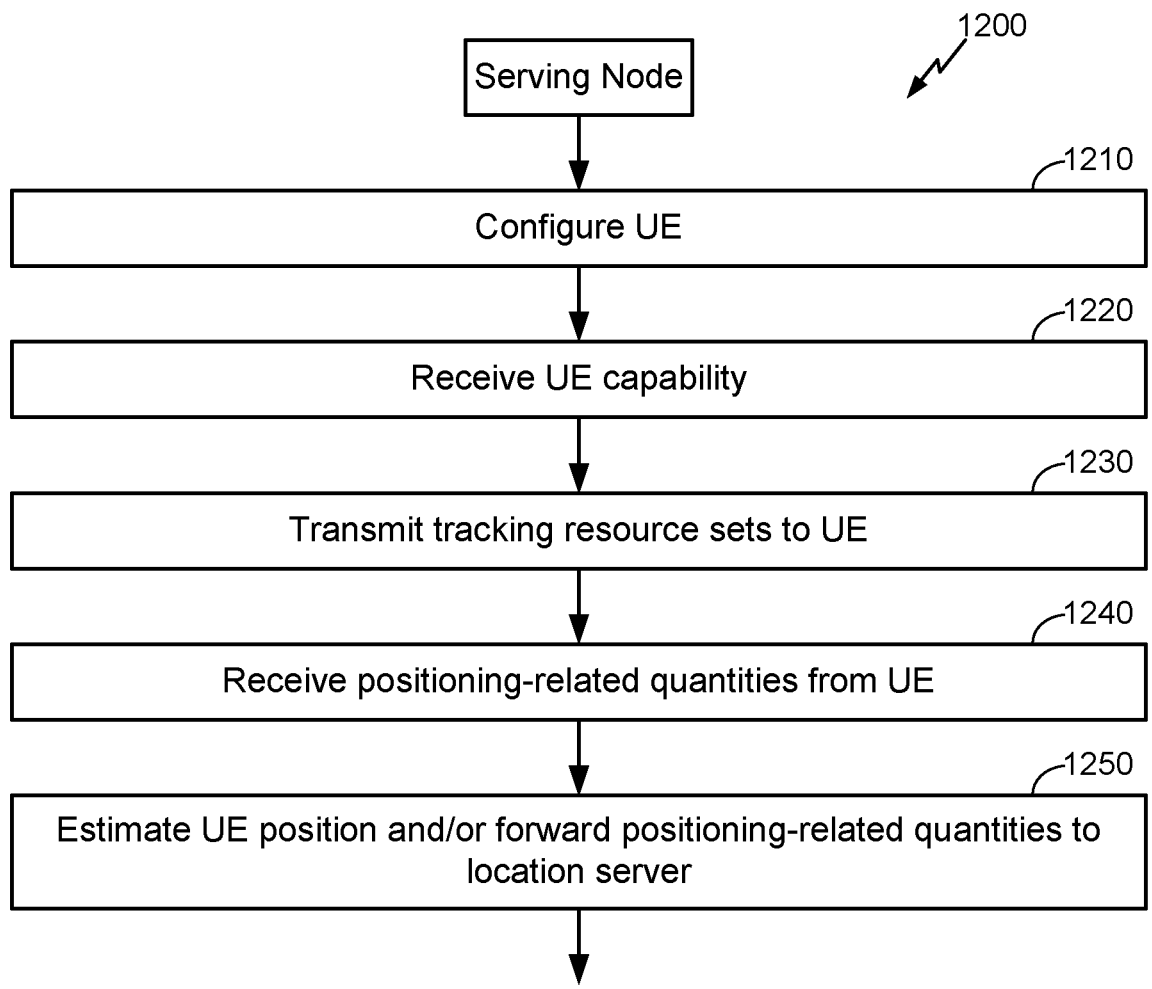
FIG. 12 illustrates an exemplary method performed by a network node.

FIG. 12 illustrates an exemplary method 1200 performed by a network node (e.g., a base station) for position determination. The network node may be a serving node serving a user equipment (UE). In an aspect, the memory 376 of the base station 310 in FIG. 3 may be an example of a computer-readable medium that stores computer executable instructions for one or more of the TX processor 316, the controller/processor 375, the channel estimator 374, and/or the RX processor 370 of the network node 310 of FIG. 3A to perform the method 1200. In another aspect, the memory(ies) 560 of the base station 500 in FIG. 5 may be an example of a computer-readable medium that stores computer executable instructions for one or more of the processor(s) 510, the DSP(s) 520, the transceiver(s) 530 and/or 570, the and/or sensor(s) 450 of the base station 500 to perform the method 1200.

At 1210, the network node may configure the UE with the plurality of resource settings. In an aspect, means to perform block 1210 may include one or more of the controller/processor 375, the memory 376, the TX processor 316, the transmitter 318TX, and/or the antenna 320 of the network node 310 illustrated in FIG. 3. In another aspect, means to perform block 1210 may include one or more of the processor(s) 510, the DSP(s) 520, the transceiver(s) 530, the antenna(s) 532, and/or the memory(ies) 560 450 of the base station 500.

At 1220, the network node may receive UE capability report from the UE. In an aspect, means to perform block 1220 may include one or more of the controller/processor 375, the memory 376, the RX processor 370, the receiver 318RX, and/or the antenna 320 of the network node 310 illustrated in FIG. 3. In another aspect, means to perform block 1220 may include one or more of the processor(s) 510, the DSP(s) 520, the transceiver(s) 530, the antenna(s) 532, and/or the memory(ies) 560 of the base station 500.

At 1230, the network node may transmit multiple correlated tracking resource sets such as the first and second tracking resource sets to the UE. In an aspect, means to perform block 1230 may include one or more of the controller/processor 375, the memory 376, the TX processor 316, the transmitter 318TX, and/or the antenna 320 of the network node 310 illustrated in FIG. 3. In another aspect, means to perform block 1230 may include one or more of the processor(s) 510, the DSP(s) 520, the transceiver(s) 530, the antenna(s) 532, and/or the memory(ies) 560 of the base station 500.

At 1240, the network node may receive positioning related quantities from the UE. In an aspect, means to perform block 1240 may include one or more of the controller/processor 375, the memory 376, the RX processor 370, the receiver 318RX, and/or the antenna 320 of the network node 310 illustrated in FIG. 3. In another aspect, means to perform block 1240 may include one or more of the processor(s) 510, the DSP(s) 520, the transceiver(s) 530, the antenna(s) 532, and/or the memory(ies) 560 of the base station 500.

At 1250, the network node may estimate the position of the UE based on the positioning related quantities. Alternatively, or in addition thereto, the UE (e.g., base station 310, specifically, controller/processor 375 and/or RX processor 370) may forward the positioning related quantities to the location server, LMF, etc. In an aspect, means to perform block 1250 may include one or more of the controller/processor 375, the memory 376, the TX processor 316, the transmitter 318TX, and/or the antenna 320 of the network node 310 illustrated in FIG. 3. In another aspect, means to perform block 1250 may include one or more of the processor(s) 510, the DSP(s) 520, the transceiver(s) 570, and/or the memory(ies) 560 of the base station 500.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A user equipment (UE), comprising:
a transceiver;
a memory; and
a processor,
wherein the transceiver, the memory, and/or the processor are configured to:
receive, from a network node, a plurality of tracking resource sets comprising a first tracking resource set and a second tracking resource set;
process the first tracking resource set and the second tracking resource set to determine one or more positioning related quantities; and
estimate a position of the UE based on the one or more positioning related quantities and/or report the one or more positioning related quantities to a network entity, wherein the first tracking resource set comprises a first plurality of reference signal resources, and the second tracking resource set comprises a second plurality of reference signal resources, wherein the first plurality of reference signal resources and the second plurality of reference signal resources are mapped in a frequency domain into different subcarriers which are staggered in a same bandwidth or resource blocks relative to each other within a same subframe, wherein the first plurality of reference signal resources of the first tracking resource set are transmitted from a same antenna port of the network node or are quasi-co-located (QCL'd) reference signals with the second plurality of reference signal resources of the second tracking resource set, and wherein subcarrier offsets of the plurality of reference signal resources of the respective tracking resource set are different from subcarrier offsets of the plurality of reference signal resources of all other tracking resource sets such that each subcarrier contains reference signal resources of no more than one of the plurality of tracking resource sets.

2. The UE of claim 1, wherein each reference signal resource of the first tracking resource set and the second tracking resource set is mapped into one OFDM symbol.

3. The UE of claim 1, wherein when the first tracking resource set and the second tracking resource set are QCL'd reference signals, the first tracking resource set and the second tracking resource set are QCL'd with respect to any one or more of a spatial receive (Rx) filter, a spatial transmit (Tx) filter, a Doppler shift, a Doppler spread, an average delay, and a delay spread.

4. The UE of claim 1, wherein the one or more positioning related quantities include any one or more of a time-of-arrival (ToA), a time difference-of-arrival (TDoA), a received signal time difference (RSTD), Angle of arrival (AoA), and a reference signal received power (RSRP).

5. The UE of claim 1, wherein the first plurality of reference signal resources of the first tracking resource set and the second plurality of reference signal resources of the second tracking resource set are channel state information reference signals (CSI-RSs).

6. The UE of claim 1, wherein the transceiver, the memory, and/or the processor are configured to receive higher layer protocol signaling from the network entity indicating that the first tracking resource set and the second tracking resource set are for positioning purposes.

7. The UE of claim 1,
wherein the UE is configured with a plurality of resource settings, each resource setting being associated with one of a plurality of transmission points and comprising a plurality of tracking resource sets in a same bandwidth, each transmission point being distinct from all others of the plurality of transmission points, each tracking resource set comprising a plurality of reference signal resources, and wherein for each tracking resource set of a resource setting,
the plurality of reference signal resources of the respective tracking resource set are same as the plurality of reference signal resources of other tracking resource sets of the resource setting.

8. The UE of claim 7, wherein:
in response to time division multiplexing (TDM) the plurality of tracking resource sets of the resource setting, the transceiver, the memory, the processor, or a combination thereof are configured to process the plurality of tracking resource sets of the resource setting as if they are QCL'd reference signals with respect to any one or more of a spatial receive (Rx) filter, a spatial transmit (Tx) filter, a Doppler shift, a Doppler spread, an average delay, and a delay spread;

in response to frequency division multiplexing (FDM) the plurality of tracking resource sets of the resource setting, the transceiver, the memory, the processor, or a combination thereof are configured to process the plurality of tracking resource sets of the resource setting as if they are reference signals from a same antenna port of the network node;
or both.

9. The UE of claim 7,
wherein each resource setting is identified with a radio resource control (RRC) configured value related to the transmission point associated with the resource setting, and wherein all resources of the plurality of tracking resource sets of each resource setting are scrambled based on the RRC configured value.

10. The UE of claim 7, wherein for each resource setting, a subcarrier offset of each of the plurality of tracking resource sets of the resource setting is such that when the plurality of tracking resource sets are combined, a pattern of resources is uniform in the frequency domain.

11. The UE of claim 7,
wherein the plurality of resource settings are implemented as a plurality of channel state information reference signal (CSI-RS) resource settings, wherein the plurality of tracking resource sets of each resource setting are implemented as a plurality of CSI-RS resource sets of each corresponding CSI-RS setting, and wherein the plurality of reference signal resources of each tracking resource set are implemented as a plurality of CSI-RS resources of each corresponding CSI-RS resource sets.

12. A network node, comprising:
a transceiver;
a memory; and
a processor,
wherein the transceiver, the memory, and/or the processor are configured to:
transmit, to a user equipment (UE), a plurality of tracking resource sets comprising a first tracking resource set and a second tracking resource set;
receive, from the UE, one or more positioning related quantities based on the first tracking resource set and the second tracking resource set; and
estimate a position of the UE based on the one or more positioning related quantities and/or forward the one or more positioning related quantities to a network entity, wherein the first tracking resource set comprises a first plurality of reference signal resources, and the second tracking resource set comprises a second plurality of reference signal resources, wherein the first plurality of reference signal resources and the second plurality of reference signal resources are mapped in a frequency domain into different subcarriers which are staggered in a same bandwidth or resource blocks relative to each other within a same subframe, wherein the first plurality of reference signal resources of the first tracking resource set are transmitted from a same antenna port of the network node or are quasi-co-located (QCL'd) reference signals with the second plurality of reference signal resources of the second tracking resource set, and wherein subcarrier offsets of the plurality of reference signal resources of the respective tracking resource set are different from subcarrier offsets of the plurality of reference signal resources of all other tracking resource sets such that each subcarrier contains reference signal resources of no more than one of the plurality of tracking resource sets.

13. The network node of claim 12,
wherein the first tracking resource set and the second tracking resource set belong on a same resource setting, and
wherein a first subcarrier offset of the first tracking resource set and a second subcarrier offset of the second tracking resource set of the same resource setting are such that when the first tracking resource set and the second tracking resource set are combined, a pattern of resources is uniform in the frequency domain.

14. The network node of claim 12, wherein when the first tracking resource set and the second tracking resource set are QCL'd reference signals, the first tracking resource set and the second tracking resource set are QCL'd with respect to any one or more of a spatial receive (Rx) filter, a spatial transmit (Tx) filter, a Doppler shift, a Doppler spread, an average delay, and a delay spread.

15. The network node of claim 12, wherein the one or more positioning related quantities include any one or more of a time-of-arrival (ToA), a time difference-of-arrival (TDoA), a received signal time difference (RSTD), Angle of arrival (AoA), and a reference signal received power (RSRP).

16. The network node of claim 12, wherein the first plurality of reference signal resources of the first tracking resource set and the second plurality of reference signal resources of the second tracking resource set are channel state information reference signals (CSI-RSs).

17. The network node of claim 12, wherein the transceiver, the memory, and/or the processor are further configured to send a radio resource control (RRC) signaling to the UE indicating that the first tracking resource set and the second tracking resource set are for positioning purposes.

18. The network node of claim 12,
wherein the transceiver, the memory, and/or the processor are further configured to configure the UE with a plurality of resource settings, each resource setting being associated with one of a plurality of transmission points and comprising a plurality of tracking resource sets in a same bandwidth, each transmission point being distinct from all others of the plurality of transmission points, each tracking resource set comprising a plurality of reference signal resources, and
wherein for each tracking resource set of a resource setting,
the plurality of reference signal resources of the respective tracking resource set are same as the plurality of reference signal resources of other tracking resource sets of the resource setting.

19. The network node of claim 18, wherein transmission timings of the tracking resource sets associated with at least one resource setting is independent of transmission timings of the tracking resource sets associated with at least one other resource setting.

20. A method performed by a user equipment (UE), the method comprising:
receiving, from a network node, a plurality of tracking resource sets comprising a first tracking resource set and a second tracking resource set;
processing the first tracking resource set and the second tracking resource set to determine one or more positioning related quantities; and
estimating a position of the UE based on the one or more positioning related quantities and/or reporting the one or more positioning related quantities to a network entity,
wherein the first tracking resource set comprises a first plurality of reference signal resources, and the second tracking resource set comprises a second plurality of reference signal resources,
wherein the first plurality of reference signal resources and the second plurality of reference signal resources are mapped in a frequency domain into different subcarriers which are staggered in a same bandwidth or resource blocks relative to each other within a same subframe,
wherein the first plurality of reference signal resources of the first tracking resource set are transmitted from a same antenna port of the network node or are quasi-co-located (QCL'd) reference signals with the second plurality of reference signal resources of the second tracking resource set, and
wherein subcarrier offsets of the plurality of reference signal resources of the respective tracking resource set are different from subcarrier offsets of the plurality of reference signal resources of all other tracking resource sets such that each subcarrier contains reference signal resources of no more than one of the plurality of tracking resource sets.

21. The method of claim 20,
wherein each reference signal resource of the first tracking resource set and the second tracking resource set is mapped into one OFDM symbol,
wherein when the first tracking resource set and the second tracking resource set are QCL'd reference signals, the first tracking resource set and the second tracking resource set are QCL'd with respect to any one or more of a spatial receive (Rx) filter, a spatial transmit (Tx) filter, a Doppler shift, a Doppler spread, an average delay, and a delay spread, and/or
wherein the one or more positioning related quantities include any one or more of a time-of-arrival (ToA), a time difference-of-arrival (TDoA), a received signal time difference (RSTD), Angle of arrival (AoA), and a reference signal received power (RSRP).

22. The method of claim 20,
wherein the first plurality of reference signal resources of the first tracking resource set and the second plurality of reference signal resources of the second tracking resource set are channel state information reference signals (CSI-RSs), and
wherein the method further comprises determining that the first tracking resource set and the second tracking resource set are for positioning purposes when there is one CSI report configuration associated with a resource setting which indicates that the one or more positioning related quantities are fed back to the network node.

23. The method of claim 20,
wherein the UE is configured with a plurality of resource settings, each resource setting being associated with one of a plurality of transmission points and comprising a plurality of tracking resource sets in a same bandwidth, each transmission point being distinct from all others of the plurality of transmission points, each tracking resource set comprising a plurality of reference signal resources, and wherein for each tracking resource set of a resource setting, the plurality of reference signal resources of the respective tracking resource set are same as the plurality of reference signal resources of other tracking resource sets of the resource setting.

24. The method of claim 23, wherein in response to time division multiplexing (TDM) the plurality of tracking resource sets of the resource setting, the method further comprising processing the plurality of tracking resource sets of the resource setting as if they are QCL'd reference signals with respect to any one or more of a spatial receive (Rx) filter, a spatial transmit (Tx) filter, a Doppler shift, a Doppler spread, an average delay, and a delay spread;

in response to frequency division multiplexing (FDM) the plurality of tracking resource sets of the resource setting, the method further comprising processing the plurality of tracking resource sets of the resource setting as if they are reference signals from a same antenna port of the network node;

or both.

25. The method of claim 23, wherein for each resource setting, a subcarrier offset of each of the plurality of tracking resource sets of the resource setting is such that when the plurality of tracking resource sets are combined, a pattern of resources is uniform in the frequency domain.

26. A method performed by a network node, the method comprising:

transmitting, to a user equipment (UE), a plurality of tracking resource sets comprising a first tracking resource set and a second tracking resource set;

receiving, from the UE, one or more positioning related quantities based on the first tracking resource set and the second tracking resource set; and estimating a position of the UE based on the one or more positioning related quantities and/or forwarding the one or more positioning related quantities to a location server, wherein the first tracking resource set comprises a first plurality of reference signal resources, and the second tracking resource set comprises a second plurality of reference signal resources, wherein the first plurality of reference signal resources and the second plurality of reference signal resources are mapped in a frequency domain into different subcarriers which are staggered in a same bandwidth or resource blocks relative to each other within a same subframe, wherein the first plurality of reference signal resources of the first tracking resource set are transmitted from a same antenna port of the network node or are quasi-co-located (QCL'd) reference signals with the second plurality of reference signal resource of the second tracking resource set, and wherein subcarrier offsets of the plurality of reference signal resources of the respective tracking resource set are different from subcarrier offsets of the plurality of reference signal resources of all other tracking resource sets such that each subcarrier contains reference signal resources of no more than one of the plurality of tracking resource sets.

27. The method of claim 26, wherein the first tracking resource set and the second tracking resource set belong on a same resource setting, and wherein a first subcarrier offset of the first tracking resource set and a second subcarrier offset of the second tracking resource set of the same resource setting are such that when the first tracking resource set and the second tracking resource set are combined, a pattern of resources is uniform in the frequency domain.

28. The method of claim 26, wherein when the first tracking resource set and the second tracking resource set are QCL'd reference signals, the first tracking resource set and the second tracking resource set are QCL'd with respect to any one or more of a spatial receive (Rx) filter, a spatial transmit (Tx) filter, a Doppler shift, a Doppler spread, an average delay, and a delay spread, and/or wherein the one or more positioning related quantities include any one or more of a time-of-arrival (ToA), a time difference-of-arrival (TDoA), a received signal time difference (RSTD), Angle of arrival (AoA), and a reference signal received power (RSRP).

29. The method of claim 26, wherein the first plurality of reference signal resources of the first tracking resource set and the second plurality of reference signal resources of the second tracking resource set are channel state information reference signals (CSI-RSs), and/or wherein the method further comprises sending a radio resource control (RRC) signaling to the UE indicating that the first tracking resource set and the second tracking resource set are for positioning purposes.

30. The method of claim 26 wherein the method further comprises configuring the UE with a plurality of resource settings, each resource setting being associated with one of a plurality of transmission points and comprising a plurality of tracking resource sets in a same bandwidth, each transmission point being distinct from all others of the plurality of transmission points, each tracking resource set comprising a plurality of reference signal resources, and wherein for each tracking resource set of a resource setting, the plurality of reference signal resources of the respective tracking resource set are same as the plurality of reference signal resources of other tracking resource sets of the resource setting.

* * * * *